US007132814B2

(12) United States Patent
Hatada

(10) Patent No.: US 7,132,814 B2
(45) Date of Patent: Nov. 7, 2006

(54) METHOD OF CALCULATING CORRECTION VALUE AND METHOD OF MANUFACTURING PRINTER

(75) Inventor: Kenji Hatada, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 35 days.

(21) Appl. No.: 11/094,847

(22) Filed: Mar. 31, 2005

(65) Prior Publication Data

US 2005/0225279 A1 Oct. 13, 2005

(30) Foreign Application Priority Data

Mar. 31, 2004 (JP) ............................. 2004-105572
Jun. 4, 2004 (JP) ............................. 2004-167777
Jan. 21, 2005 (JP) ............................. 2005-014260

(51) Int. Cl.
*G05B 11/42* (2006.01)

(52) U.S. Cl. ...................... 318/610; 318/602; 318/603; 318/568.22; 318/632

(58) Field of Classification Search ................ 318/610, 318/632, 603, 602, 609; 388/815, 907.5; 399/69; 355/282
See application file for complete search history.

(56) References Cited

U.S. PATENT DOCUMENTS 6,111,384 A * 8/2000 Stagnitto .................... 318/602
2004/0164691 A1* 8/2004 Andoh et al. ............... 318/268

FOREIGN PATENT DOCUMENTS

JP 2003-79172 A 3/2003

* cited by examiner

*Primary Examiner*—Karen Masih
(74) *Attorney, Agent, or Firm*—Sughrue Mion, PLLC

(57) ABSTRACT

A correction value calculating method includes: preparing a printer including a motor, a PID control system for controlling the motor, and a memory for storing a correction value, the printer being configured to calculate a value of a current flowing through the motor based on the correction value and an output value of an integral element of the PID control system; obtaining in advance a relationship, for when a property of a motor fluctuates, between a correction value and a sum of an output value of the integral element when a motor is driven at a first velocity and an output value of the integral element when the motor is driven at a second velocity; driving the motor of the printer at the first velocity and measuring an output value of the integral element at that velocity; driving the motor of the printer at the second velocity and measuring an output value of the integral element at that velocity; and determining the correction value to be stored in the memory based on the relationship and a sum of the two measured output values.

10 Claims, 20 Drawing Sheets

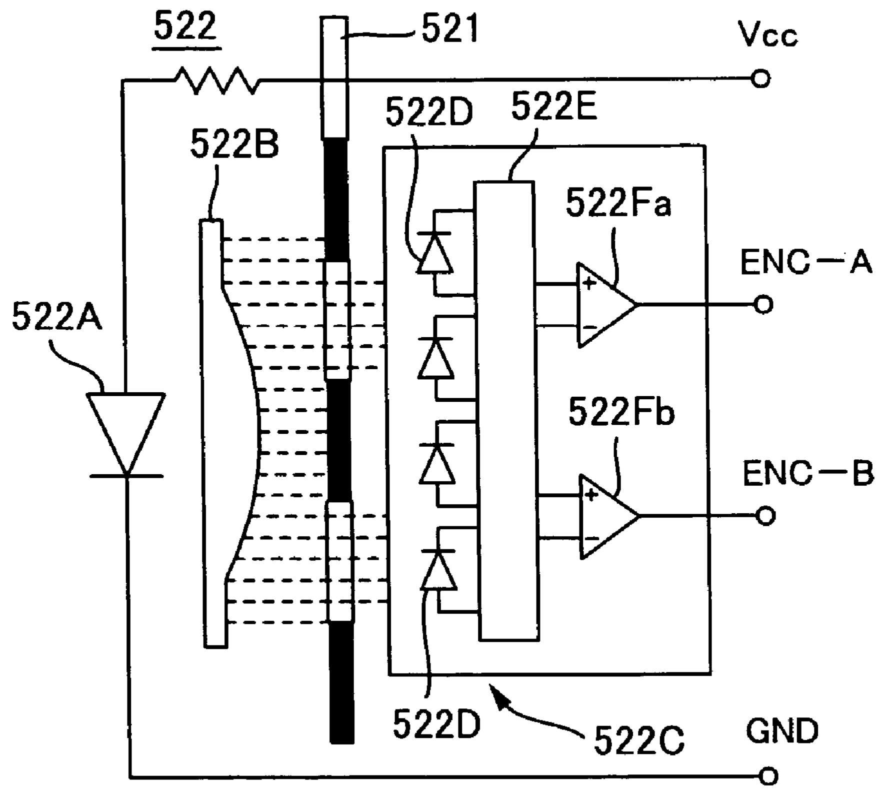
FIG. 7
FIG. 8A
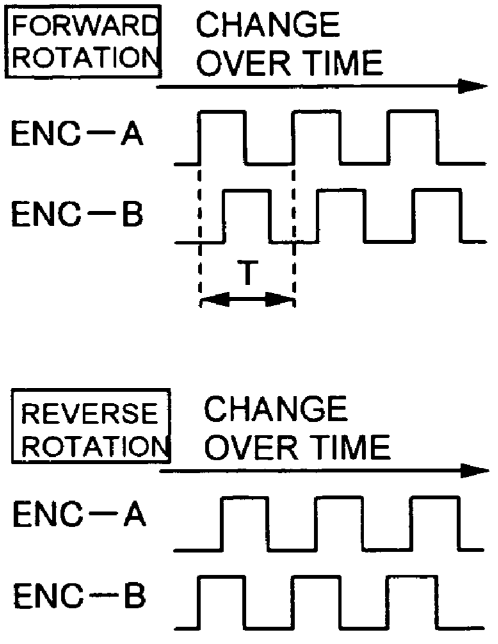
FIG. 8B

FIG. 11A
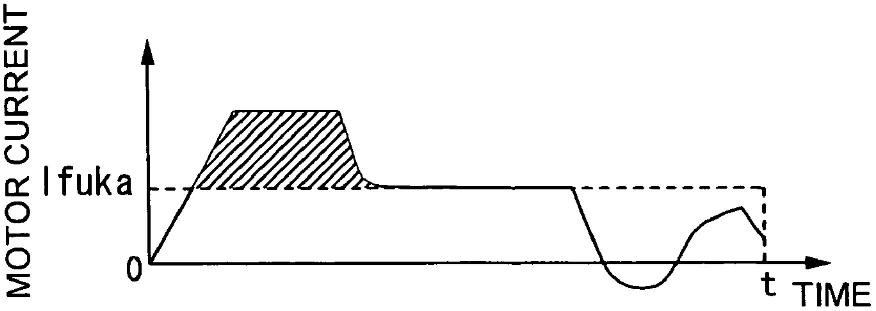
FIG. 11B
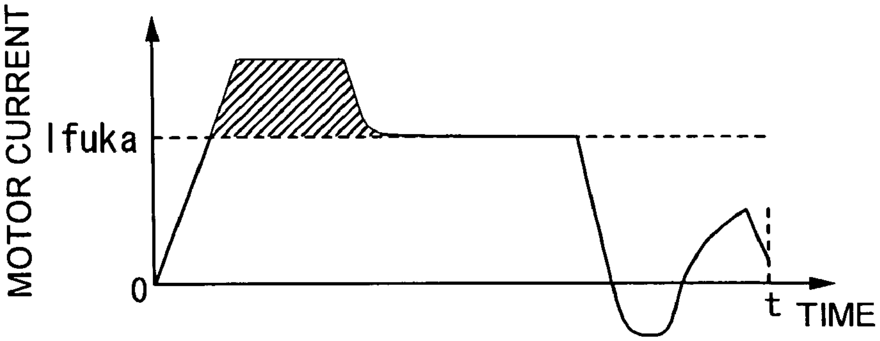
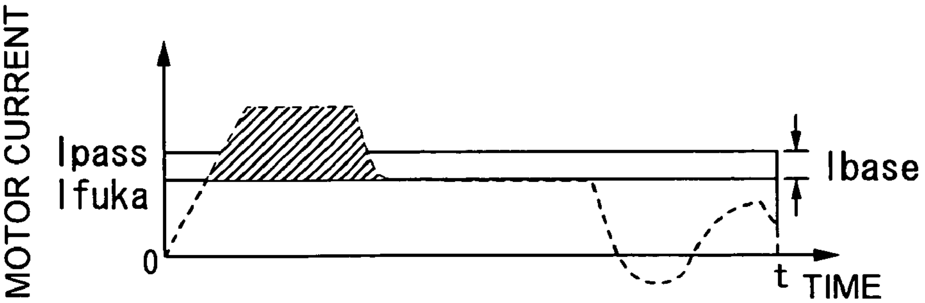
FIG. 12

Ibase TABLE UNIT: mA

| MOVEMENT DISTANCE | | MOVEMENT VELOCITY V | | | | |
|---|---|---|---|---|---|---|
| | | 1 | 2 | 3 | ⋯ | n |
| Y | ENCODER PULSE | V1 | V2 | V3 | ⋯ | Vn |
| 1 | 100 | Ib11 | Ib12 | Ib13 | ⋯ | Ib1n |
| 2 | 200 | Ib21 | Ib22 | Ib23 | ⋯ | Ib2n |
| 3 | 300 | Ib31 | Ib32 | Ib33 | ⋯ | Ib3n |
| ⋮ | ⋮ | ⋮ | ⋮ | ⋮ | ⋮ | ⋮ |

FIG. 13 tpass TABLE UNIT: ms

| MOVEMENT DISTANCE | | MOVEMENT VELOCITY V | | | | |
|---|---|---|---|---|---|---|
| | | 1 | 2 | 3 | ⋯ | n |
| Y | ENCODER PULSE | V1 | V2 | V3 | ⋯ | Vn |
| 1 | 100 | tp11 | tp12 | tp13 | ⋯ | tp1n |
| 2 | 200 | tp21 | tp22 | tp23 | ⋯ | tp2n |
| 3 | 300 | tp31 | tp32 | tp33 | ⋯ | tp3n |
| ⋮ | ⋮ | ⋮ | ⋮ | ⋮ | ⋮ | ⋮ |

FIG. 14

Qpass TABLE UNIT: ms

| MOVEMENT DISTANCE | | MOVEMENT VELOCITY V | | | | |
|---|---|---|---|---|---|---|
| | | 1 | 2 | 3 | ··· | n |
| Y | ENCODER PULSE | V1 | V2 | V3 | ··· | Vn |
| 1 | 100 | Q11 | Q12 | Q13 | ··· | Q1n |
| 2 | 200 | Q21 | Q22 | Q23 | ··· | Q2n |
| 3 | 300 | Q31 | Q32 | Q33 | ··· | Q3n |
| ⋮ | ⋮ | ⋮ | ⋮ | ⋮ | ⋮ | ⋮ |

(UNDER NORMAL CONDITIONS)

(DURING HEAT PRODUCTION RESTRICTION CONTROL)

PRESENT EMBODIMENT

COMPARATIVE EXAMPLE

PRESENT EMBODIMENT

COMPARATIVE EXAMPLE

HEAT-PRODUCTION-DURING-ACCELERATION TABLE

| MOVEMENT AMOUNT | Qbase | ACCELERATION PERIOD |
|---|---|---|
| GREATER THAN 2000mm | Qb0 | ta0 |
| 1000~2000mm | Qb1 | ta1 |
| 500~1000mm | Qb2 | ta2 |
| 100~500mm | Qb3 | ta3 |
| LESS THAN 100mm | Qb4 | ta4 |

METHOD OF CALCULATING CORRECTION VALUE AND METHOD OF MANUFACTURING PRINTER

CROSS-REFERENCE TO RELATED APPLICATIONS

The present application claims priority upon Japanese Patent Application No. 2004-105572 filed on Mar. 31, 2004, Japanese Patent Application No. 2004-167777 filed on Jun. 4, 2004, and Japanese Patent Application No. 2005-014260 filed on Jan. 21, 2005, which are herein incorporated by reference.

BACKGROUND OF THE INVENTION

1. Field of the Invention

The present invention relates to methods of calculating correction values and methods of manufacturing printers provided with motors.

2. Description of the Related Art

Printers are provided with various types of motors, including carriage motors for moving a carriage and carry motors for carrying paper. To control these motors, printers are provided with PID control circuits.

The amount of current that flows through a motor when the motor is driven changes according to the load on that motor. Accordingly, if the value of the current that is flowing through the motor cannot be measured directly, then the output value of an integral element of the PID control circuit is measured, and the value of the current flowing through the motor is calculated based on this output value of the integral element.

Motors have individual differences, however, and thus errors occur when the property values of a standard motor are used to calculate the current value from the output value of the integral element. Accordingly, current values calculated based on the property values of a standard motor are corrected by a correction value (see JP 2003-79172 A).

However, the current value cannot be calculated accurately unless a correction value that is suited for the individual differences of the motor has been set properly.

SUMMARY OF THE INVENTION

It is an object of the present invention to set, to a printer, correction values that are suited for the individual differences of the motors.

A first primary invention for achieving the foregoing object is a method of calculating a correction value, comprising the steps of: preparing a printer that is provided with a motor, a PID control system for controlling the motor, and a memory for storing a correction value, the printer being configured to calculate a value of a current flowing through the motor based on the correction value and an output value of an integral element of the PID control system; obtaining in advance a relationship, for when a property of a motor fluctuates, between a correction value and a sum of an output value of the integral element when a motor is driven at a first velocity and an output value of the integral element when the motor is driven at a second velocity; driving the motor of the printer at the first velocity and measuring an output value of the integral element at that velocity; driving the motor of the printer at the second velocity and measuring an output value of the integral element at that velocity; and determining the correction value to be stored in the memory based on the relationship and a sum of the two output values that have been measured.

A second primary invention for achieving the foregoing object is a method of manufacturing a printer, comprising the steps of: preparing a printer that is provided with a motor, a PID control system for controlling the motor, and a memory for storing a correction value, the printer being configured to calculate a value of a current flowing through the motor based on the correction value and an output value of an integral element of the PID control system; obtaining in advance a relationship, for when a property of a motor fluctuates, between a correction value and a sum of an output value of the integral element when a motor is driven at a first velocity and an output value of the integral element when the motor is driven at a second velocity; driving the motor of the printer at the first velocity and measuring an output value of the integral element at that velocity; driving the motor of the printer at the second velocity and measuring an output value of the integral element at that velocity; and storing, in the memory of the printer, the correction value to be stored in the memory that is determined based on the relationship and a sum of the two output values that have been measured.

Other features of the present invention will become clear through the accompanying drawings and the following description.

BRIEF DESCRIPTION OF THE DRAWINGS

FIG. 7 is an explanatory diagram of the structure of the rotary encoder;

FIG. 8A is a timing chart of the waveform of the output signal during forward rotation, and FIG. 8B is a timing chart of the waveform of the output signal during reverse rotation;

FIG. 11A is a graph showing the relationship between time and the current value when the motor load is small, and FIG. 11B is a graph showing the relationship between time and the current value when the motor load is large;

FIG. 12 is a graph describing the load current and the acceleration/deceleration current of the CR motor;

FIG. 13 shows the Ibase table;

FIG. 14 shows the tpass table;

DETAILED DESCRIPTION OF THE INVENTION

Figure 1:
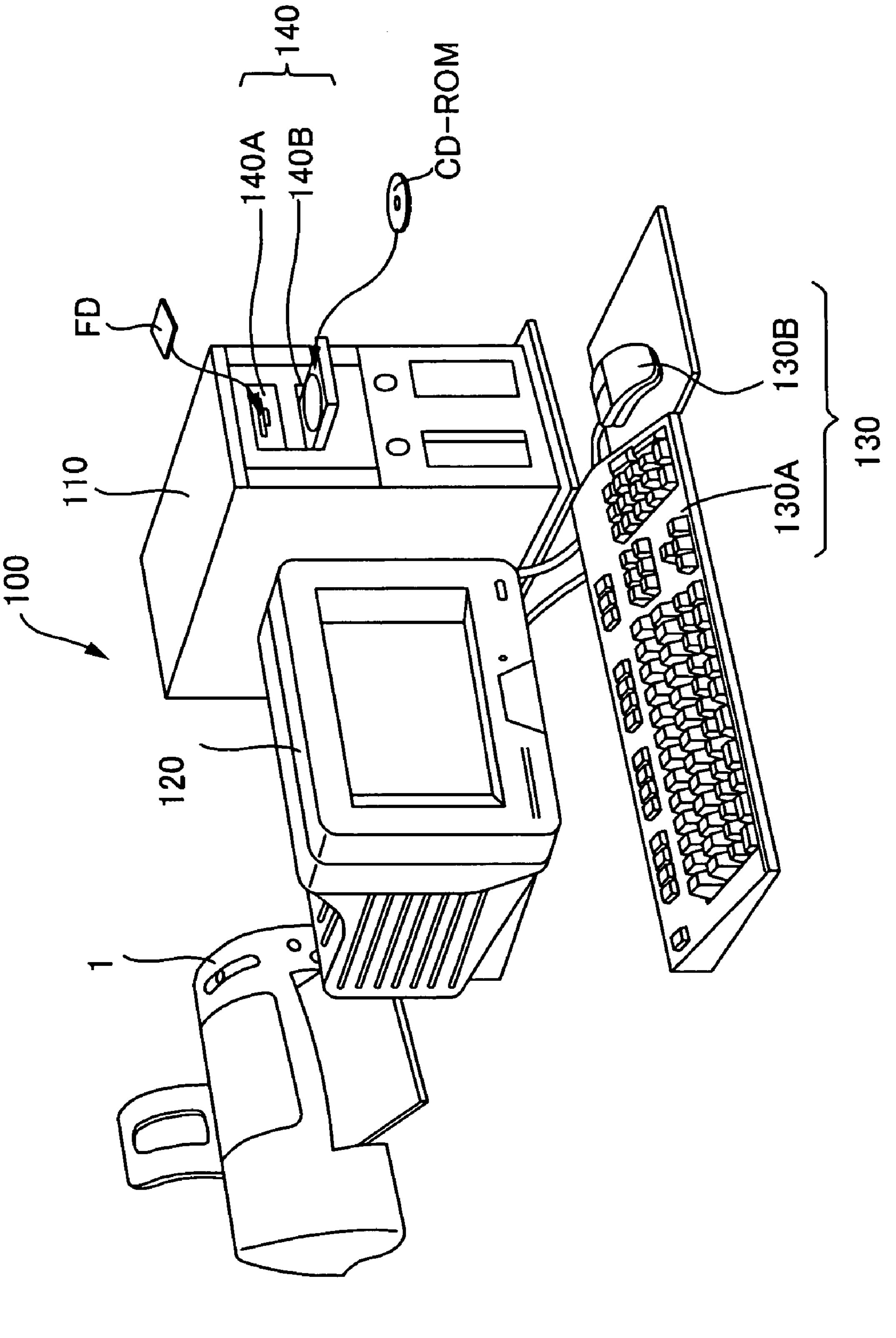
FIG. 1 is an explanatory diagram of the overall structure of the printing system.

At least the following matters will become clear through the description below and the accompanying drawings.

A method of calculating a correction value, comprises the steps of:

preparing a printer that is provided with a motor, a PID control system for controlling the motor, and a memory for storing a correction value, the printer being configured to calculate a value of a current flowing through the motor based on the correction value and an output value of an integral element of the PID control system;

obtaining in advance a relationship, for when a property of a motor fluctuates, between a correction value and a sum of an output value of the integral element when a motor is driven at a first velocity and an output value of the integral element when the motor is driven at a second velocity;

driving the motor of the printer at the first velocity and measuring an output value of the integral element at that velocity;

driving the motor of the printer at the second velocity and measuring an output value of the integral element at that velocity; and determining the correction value to be stored in the memory based on the relationship and a sum of the two output values that have been measured.

With this correction value calculation method, it is possible to calculate a correction value that is suited for the motor of the printer that is being manufactured.

In this correction value calculation method, it is preferable that a property value of the motor fluctuates within a predetermined range; and that the relationship is obtained based on a standard property value of the motor and the property value of the motor fluctuating within the predetermined range. It is also preferable that the above-described relationship is a relationship between the correction value and a difference between "a value corresponding to a sum of an output value of the integral element when a motor is driven at the first velocity and an output value of the integral element when the motor is driven at the second velocity, for when the property of the motor is standard", and "a sum of an output value of the integral element when a motor is driven at the first velocity and an output value of the integral element when the motor is driven at the second velocity, for when the property of the motor fluctuates." In this way, the correction value that is calculated becomes a value that is suited for the properties of the respective motors.

In this correction value calculation method, it is preferable that when the printer executes printing, a load on the motor changes. It is also preferable that the printer is provided with a carriage for mounting an ink cartridge; and that the motor moves the carriage. This allows the method to be particularly useful for manufacturing methods for manufacturing such printers.

In this correction value calculation method, it is preferable that the motor is driven through PWM control. With such a printer, the value of the current that flows to the motor can be calculated with high precision.

In this correction value calculation method, it is preferable that when the printer executes printing, the printer calculates an amount of heat produced by the motor based on the value of the current flowing through the motor. In this way, it is possible to manufacture a printer with which the amount of heat that is produced by the motor can be calculated with high precision.

In this correction value calculation method, it is preferable that when the printer executes printing, the printer determines a stop time during which the motor is stopped based on the value of the current flowing through the motor. In this way, it is possible to manufacture a printer whose printing speed is increased.

Further, a method of manufacturing a printer, comprises the steps of:

preparing a printer that is provided with a motor, a PID control system for controlling the motor, and a memory for storing a correction value, the printer being configured to calculate a value of a current flowing through the motor based on the correction value and an output value of an integral element of the PID control system;

obtaining in advance a relationship, for when a property of a motor fluctuates, between a correction value and a sum of an output value of the integral element when a motor is driven at a first velocity and an output value of the integral element when the motor is driven at a second velocity;

driving the motor of the printer at the first velocity and measuring an output value of the integral element at that velocity;

driving the motor of the printer at the second velocity and measuring an output value of the integral element at that velocity; and storing, in the memory of the printer, the correction value to be stored in the memory that is determined based on the relationship and a sum of the two output values that have been measured.

With this printer manufacturing method, a correction value that is suited to the motor can be set in the printer.

In this printer manufacturing method, it is preferable that a property value of the motor fluctuates within a predetermined range; and that the relationship is obtained based on a standard property value of the motor and the property value of the motor fluctuating within the predetermined range. It is also preferable that the above-described relationship is a relationship between the correction value and a difference between "a value corresponding to a sum of an output value of the integral element when a motor is driven at the first velocity and an output value of the integral element when the motor is driven at the second velocity, for when the property of the motor is standard", and "a sum of an output value of the integral element when a motor is driven at the first velocity and an output value of the integral element when the motor is driven at the second velocity, for when the property of the motor fluctuates." In this way, the correction value that is calculated becomes a value that is suited for the properties of the respective motors.

In this printer manufacturing method, it is preferable that when the printer executes printing, a load on the motor changes. It is also preferable that the printer is provided with a carriage for mounting an ink cartridge; and that the motor moves the carriage. This allows the method to be particularly useful for manufacturing methods for manufacturing such printers.

In this printer manufacturing method, it is preferable that the motor is driven through PWM control. With such a printer, the value of the current that flows to the motor can be calculated with high precision.

In this printer manufacturing method, it is preferable that when the printer executes printing, the printer calculates an amount of heat produced by the motor based on the value of the current flowing through the motor. In this way, it is possible to manufacture a printer with which the amount of heat that is produced by the motor can be calculated with high precision.

In this printer manufacturing method, it is preferable that when the printer executes printing, the printer determines a stop time during which the motor is stopped based on the value of the current flowing through the motor. In this way, it is possible to manufacture a printer whose printing speed is increased.

===Configuration of the Printing System===

An embodiment of a printing system (computer system) is described below with reference to the drawings. However, the description of the following embodiment also includes implementations relating, for example, to computer programs and storage media on which the computer programs are recorded.

FIG. 1 is an explanatory diagram showing the external structure of the printing system. A printing system 100 is provided with a printer 1, a computer 110, a display device 120, an input device 130, and a record/play device 140. The printer 1 is a printing apparatus for printing images on a medium such as paper, cloth, or film. The computer 110 is electrically connected to the printer 1, and outputs print data corresponding to an image to be printed to the printer 1 in order to print the image with the printer 1. The display device 120 has a display, and displays user interfaces of, for example, an application program or a printer driver. The input device 130 is for example a keyboard 130A and a mouse 130B, and is used to operate an application program or adjust the settings of the printer driver, for example, in accordance with the user interface that is displayed on the display device 120. A flexible disk drive device 140A and a CD-ROM drive device 140B, for example, are employed as the record/play device 140.

A printer driver is installed on the computer 110. The printer driver is a program for achieving the function of displaying the user interface on the display device 120, and in addition it also achieves the function of converting image data that have been output from the application program into print data. The printer driver is stored on a storage medium (computer-readable storage medium) such as a flexible disk FD or a CD-ROM. The printer driver can also be downloaded onto the computer 110 via the Internet. It should be noted that this program is made of codes for achieving the various functions.

It should be noted that "printing apparatus" in a narrow sense means the printer 1, but in a broader sense it means the system constituted by the printer 1 and the computer 110.

===Configuration of the Printer===

<Regarding the Configuration of the Inkjet Printer>

Figure 2:
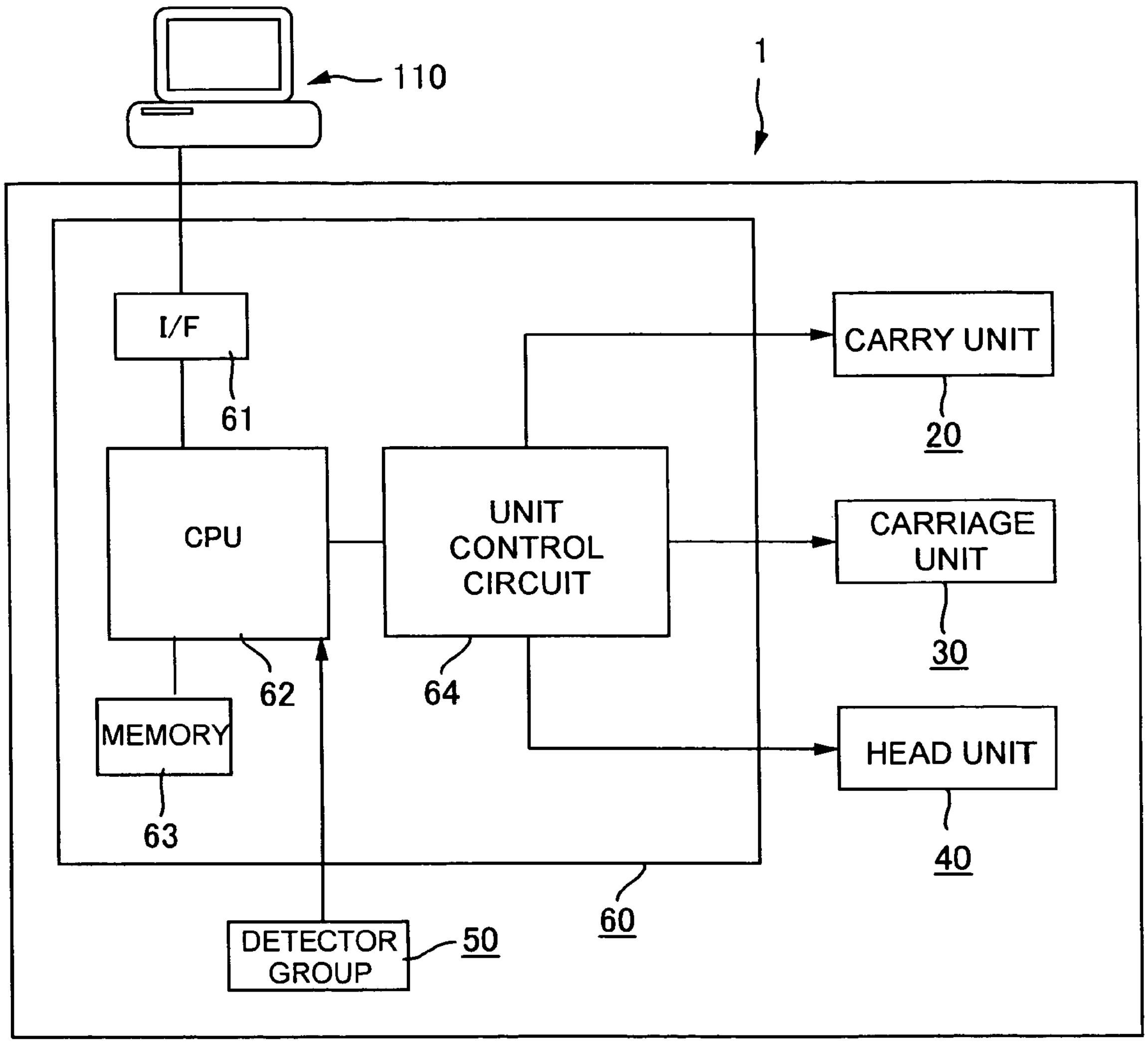
FIG. 2 is a block diagram of the overall structure of the printer.
Figure 3:
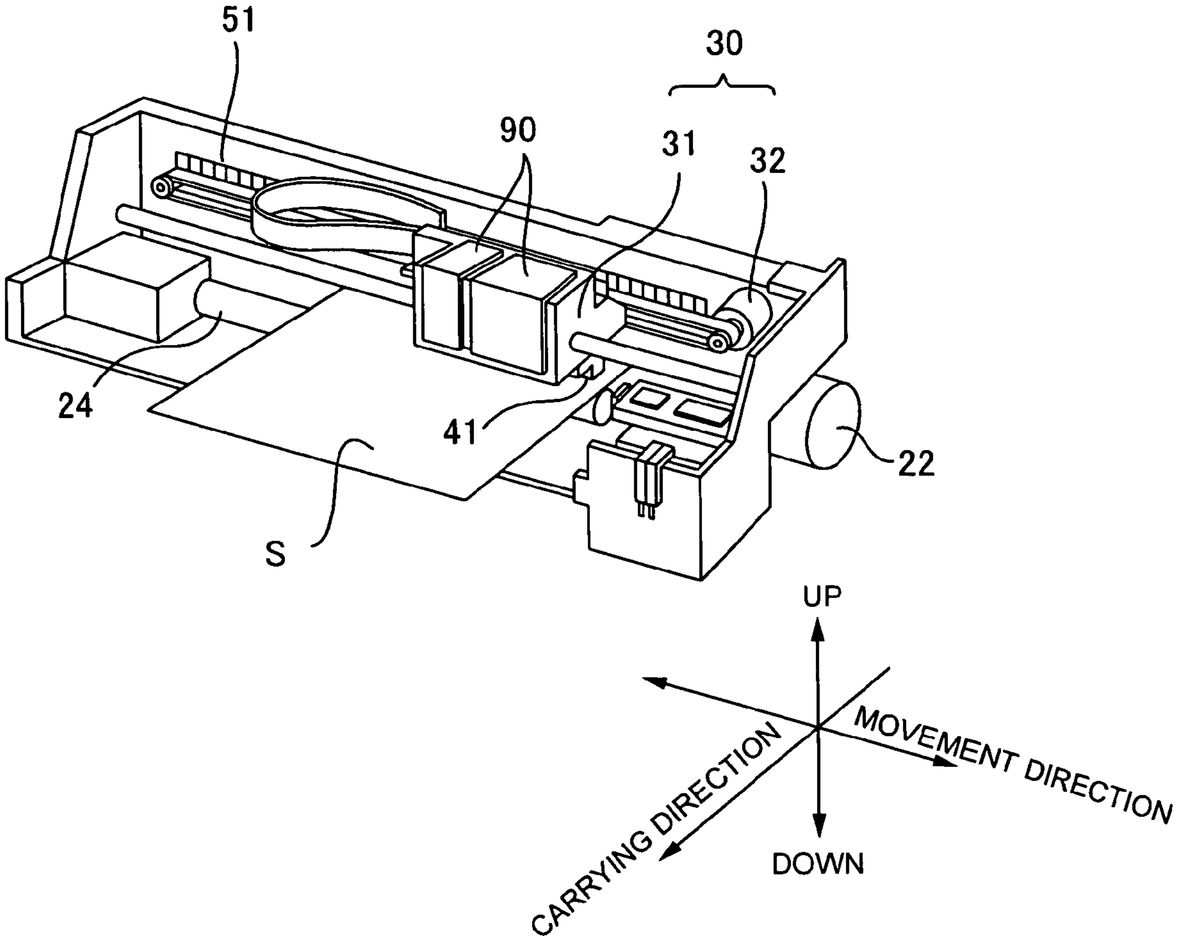
FIG. 3 is a schematic diagram of the overall structure of the printer.
Figure 4:
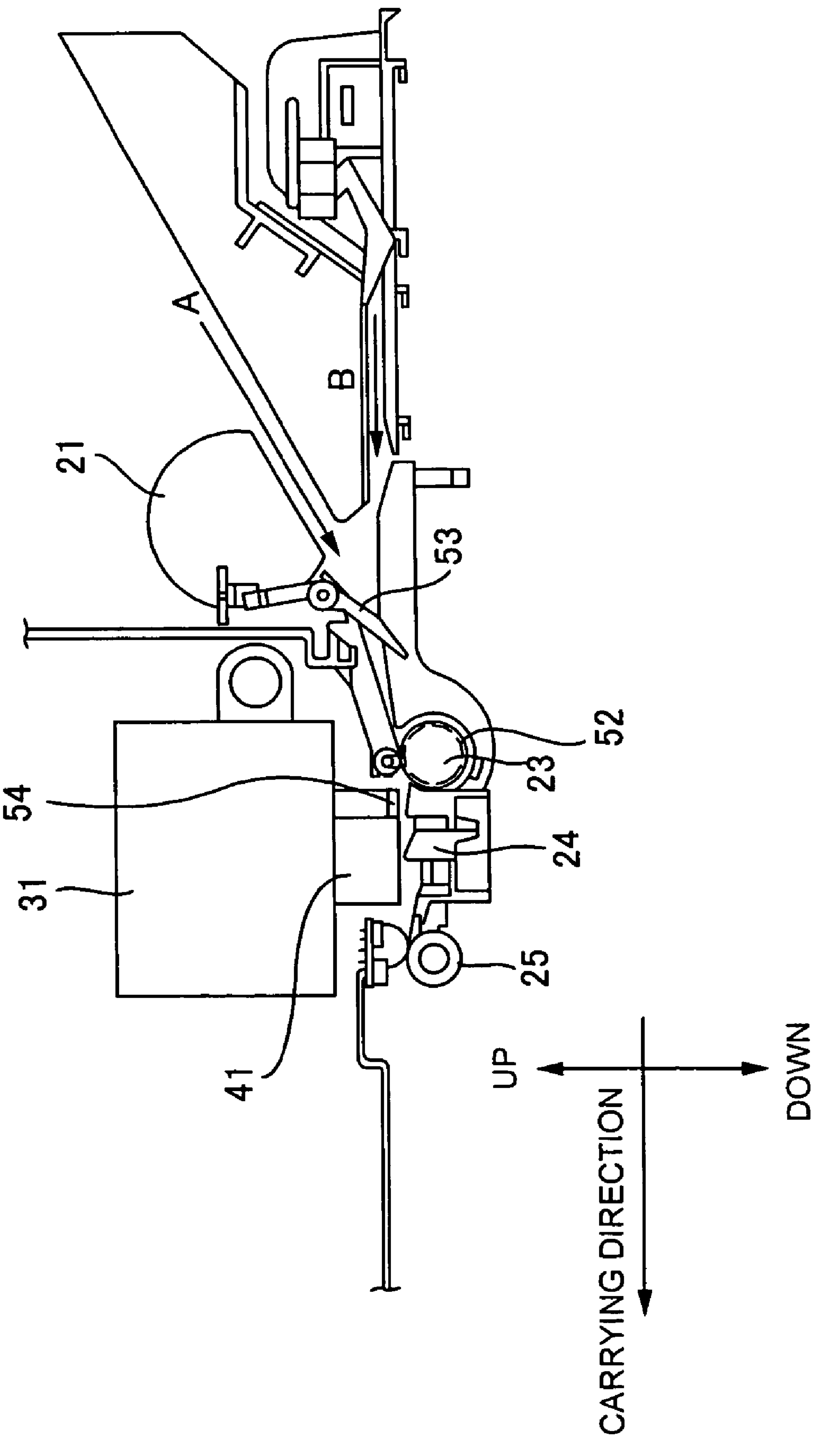
FIG. 4 is a transverse section view of the overall structure of the printer.

FIG. 2 is a block diagram of the overall configuration of the printer of this embodiment. Further, FIG. 3 is a schematic diagram of the overall configuration of the printer of this embodiment. FIG. 4 is a transverse section view of the overall configuration of the printer of this embodiment. The basic structure of the printer of the present embodiment is described below.

The printer of this embodiment has a carry unit 20, a carriage unit 30, a head unit 40, a detector group 50, and a controller 60. The printer 1, which receives print data from the computer 110 which is an external device, controls the various units (the carry unit 20, the carriage unit 30, and the head unit 40) using the controller 60. The controller 60 controls the units in accordance with the print data that are received from the computer 110 to form an image on paper. The detector group 50 monitors the conditions inside the printer 1, and it outputs its detection results to the controller 60. The controller 60 receives the detection results from the detector group 50, and controls the units based on these detection results.

The carry unit 20 is for feeding a medium (for example, paper S) up to a printable position and carrying the paper in a predetermined direction (hereinafter, referred to as the carrying direction) by a predetermined carry amount during printing. In other words, the carry unit 20 functions as a carrying mechanism (carrying means) for carrying paper. The carry unit 20 has a paper supply roller 21, a carry motor (hereinafter, referred also to as "PF motor") 22, a carry roller 23, a platen 24, and a paper discharge roller 25. However, the carry unit 20 does not necessarily have to include all of these structural elements in order to function as a carrying mechanism. The paper supply roller 21 is a roller for automatically supplying paper that has been inserted into a paper insert opening into the printer. The paper supply roller 21 has a D-shaped cross-sectional shape, and the length of its circumference section is set longer than the carrying distance to the carry roller 23, so that using this circumference section it can carry the paper up to the carry roller 23. The carry motor 22 is a motor for carrying paper in the carrying direction, and is constituted by a DC motor. The carry roller 23 is a roller for carrying the paper S that has been supplied by the paper supply roller 21 up to a printable region, and is driven by the carry motor 22. The platen 24 supports the paper S during printing. The paper discharge roller 25 is a roller for discharging the paper S for which printing has finished to the outside of the printer. The paper discharge roller 25 is rotated in synchronization with the carry roller 23.

The carriage unit 30 is for moving (also referred to as "scanning"), the head in a predetermined direction (hereinafter, this is referred to as the "movement direction"). The carriage unit 30 has a carriage 31 and a carriage motor (also referred to as "CR motor") 32. The carriage 31 can be moved back and forth in the movement direction (thus, the head is moved in the movement direction). Further, the carriage 31 detachably retains an ink cartridge containing ink. The carriage motor 32 is a DC motor for moving the carriage 31 in the movement direction.

The head unit 40 is for ejecting ink onto paper. The head unit 40 has a head 41. The head 41 has a plurality of nozzles, which are ink ejection sections, and ejects ink intermittently from the nozzles. The head 41 is provided on the carriage 31. Thus, when the carriage 31 moves in the movement direction, the head 41 also moves in the movement direction. A line made of dots (raster line) is formed on the paper in the movement direction as a result of the head 41 intermittently ejecting ink while moving in the movement direction.

The detector group 50 includes a linear encoder 51, a rotary encoder 52, a paper detection sensor 53, and an optical sensor 54, for example. The linear encoder 51 is for detecting the position of the carriage 31 in the movement direction. The rotary encoder 52 is for detecting the amount of rotation of the carry roller 23. The paper detection sensor 53 is for detecting the position of the front end of the paper to be printed. The paper detection sensor 53 is provided at a position where it can detect the position of the front end of the paper as the paper is being fed toward the carry roller 23 by the paper supply roller 21. It should be noted that the paper detection sensor 53 is a mechanical sensor that detects the front end of the paper through a mechanical mechanism. More specifically, the paper detection sensor 53 has a lever that can be rotated in the carrying direction, and this lever is disposed such that it sticks out into the path over which the paper is carried. In this way, the front end of the paper comes into contact with the lever and the lever is rotated, and thus the paper detection sensor 53 detects the position of the front end of the paper by detecting the movement of the lever. The optical sensor 54 is attached to the carriage 31. The optical sensor 54 detects whether or not the paper is present by detecting, with its light-receiving section, the light that is irradiated from its light-emitting section onto the paper and reflected therefrom. The optical sensor 54 detects the position of the edges of the paper while being moved by the carriage 31. The optical sensor 54 detects the edges of the paper optically, and thus has higher detection precision than the mechanical paper detection sensor 53.

The controller 60 is a control unit (control means) for carrying out control of the printer. The controller 60 has an interface section 61, a CPU 62, a memory 63, and a unit control circuit 64. The interface section 61 is for exchanging data between the computer 110, which is an external device, and the printer 1. The CPU 62 is a computation processing device for performing the overall control of the printer. The memory 63 is for securing a work area and an area for storing the programs of the CPU 62, for instance, and includes memory means such as a RAM or an EEPROM. The CPU 62 controls the various units via the unit control circuit 64 in accordance with programs stored on the memory 63.

<Regarding the Printing Operation>

Figure 5:
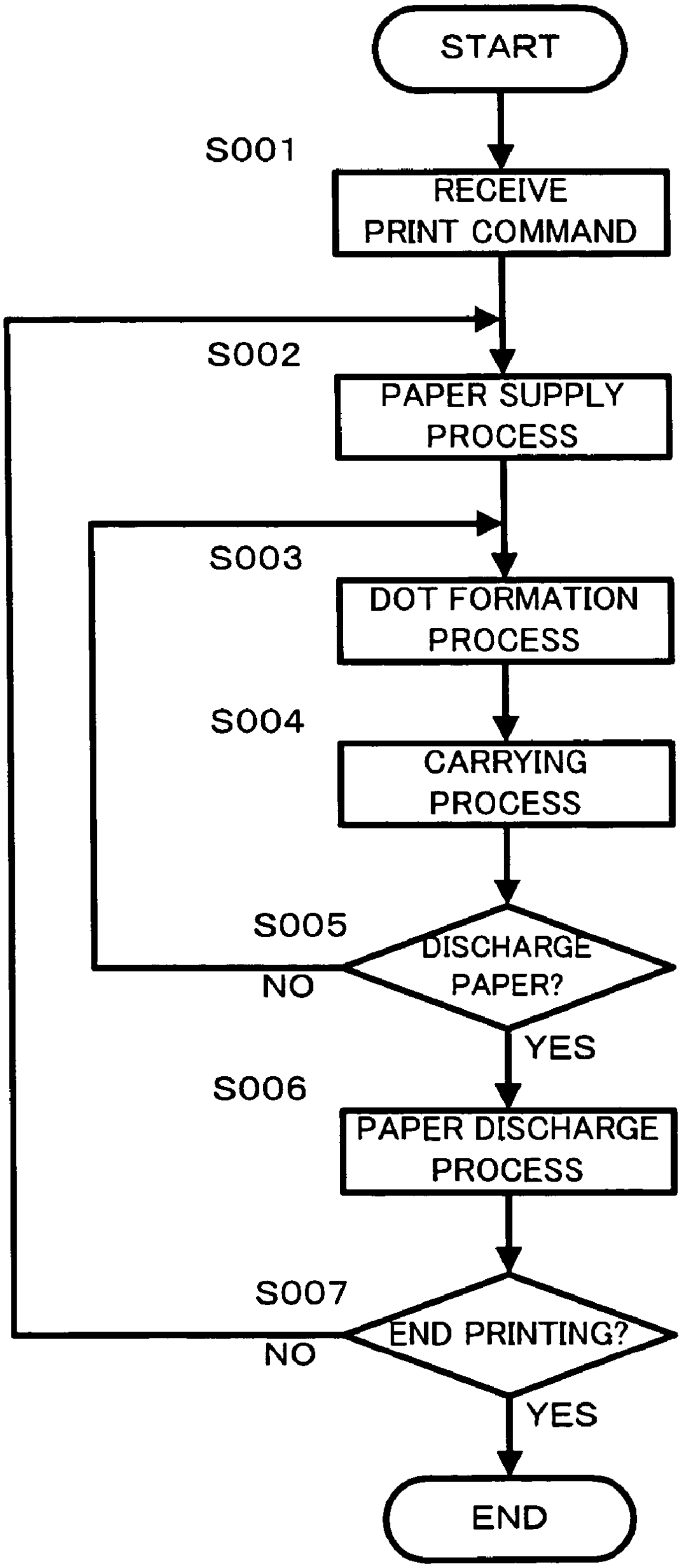
FIG. 5 is a flowchart of the processing during printing.

FIG. 5 is a flowchart of the processing during printing. The processes described below are executed by the controller 60 controlling the various units in accordance with a program stored in the memory 63. This program has codes for executing the various processes.

Receive Print Command (S001): First, the controller 60 receives a print command from the computer 110 via the interface section 61. This print command is included in the header of the print data transmitted from the computer 110. The controller 60 then analyzes the content of the various commands included in the print data that are received and uses the units to perform the following paper supply process, carrying process, and ink ejection process, for example.

Paper Supply Process (S002): The paper supply process is a process for supplying paper to be printed into the printer and positioning the paper at a print start position (also referred to as the "indexed position"). The controller 60 rotates the paper supply roller 21 to feed the paper to be printed up to the carry roller 23. The controller 60 rotates the carry roller 23 to position the paper that has been fed from the paper supply roller 21 at the print start position. When the paper has been positioned at the print start position, at least some of the nozzles of the head 41 are in opposition to the paper.

Dot Formation Process (S003): The dot formation process is a process for intermittently ejecting ink from a head that moves in the movement direction so as to form dots on the paper. The controller 60 drives the carriage motor 32 to move the carriage 31 in the movement direction. The controller 60 then causes the head to eject ink in accordance with the print data while the carriage 31 is moving. Dots are formed on the paper when ink droplets ejected from the head land on the paper. Since ink is intermittently ejected from the moving head, dot rows made of a plurality of dots in the movement direction are formed on the paper. It should be noted that a single movement of the carriage 31 in the movement direction in a single dot formation process is called a single "pass."

Carrying Process (S004): The carrying process is a process for moving the paper relative to the head in the carrying direction. The controller 60 drives the carry motor to rotate the carry roller and thereby carry the paper in the carrying direction. Due to the carrying process, the head 41 can form dots at positions that are different from the positions of the dots formed in the preceding dot formation process.

Paper Discharge Determination (S005): The controller 60 determines whether or not to discharge the paper being printed. The paper is not discharged if there still is data to be printed onto the paper being printed. The controller 60 alternately repeats the dot formation and carrying processes until there are no longer data to be printed, gradually printing an image made of dots on the paper.

Paper Discharge Process (S006): When there is no longer data to be printed on the paper being printed, the controller 60 discharges that paper by rotating the paper discharge roller. It should be noted that whether or not to discharge the paper can also be determined based on a paper discharge command included in the print data.

Print Ending Determination (S007): Next, the controller 60 determines whether or not to continue printing. If a next sheet of paper is to be printed, then printing is continued and the process of supplying the next sheet of paper is started. If a next sheet of paper is not to be printed, then the printing operation is ended.

===Carrying Process ===

<Regarding the Carrying Process>

Figure 6:
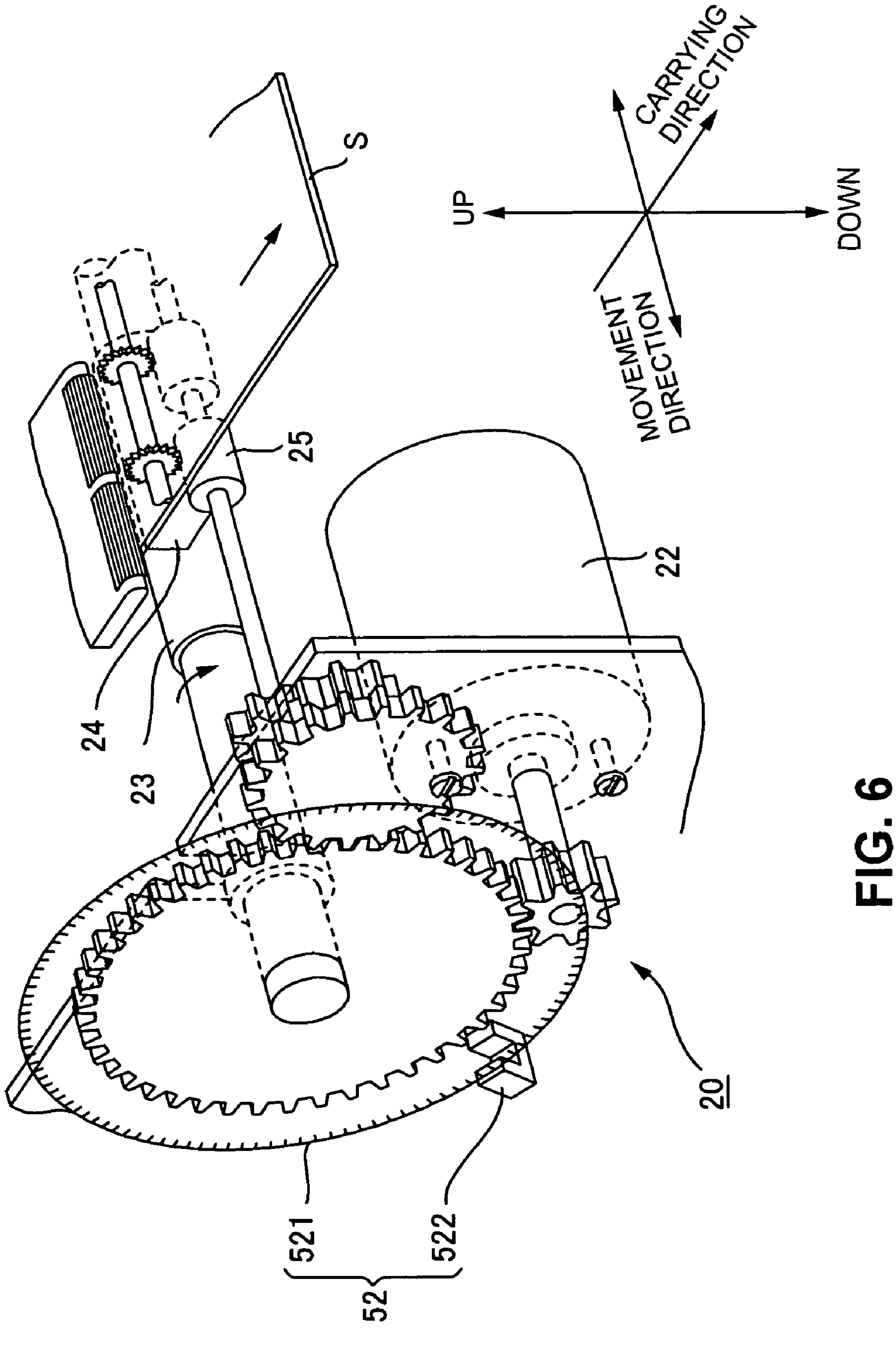
FIG. 6 is an explanatory diagram of the structure of the carry unit.

FIG. 6 is an explanatory diagram of the structure of the carry unit 20. It should be noted that in this diagram, structural elements that have already been described are assigned identical reference numerals and thus description thereof is omitted.

The carry unit 20 drives the carry motor 22 by a predetermined drive amount in accordance with a carry command from the controller. The carry motor 22 generates a drive force in the rotation direction that corresponds to the drive amount that has been ordered. The carry motor 22 then rotates the carry roller 23 using this drive force. The carry motor 22 also uses this drive force to rotate the paper discharge roller 25. That is, when the carry motor 22 generates a predetermined drive amount, the carry roller 23 and the paper discharge roller 25 rotate by a predetermined rotation amount. When the carry roller 23 and the paper discharge roller 25 are rotated by the predetermined rotation amount, the paper is carried by a predetermined carry amount. Because the carry roller 23 and the paper discharge roller 25 rotate in synchronization with one another, the paper can be carried by the carry unit 20 as long as it is in contact with at least one of the carry roller 23 and the paper discharge roller 25.

The amount by which the paper is carried is determined according to the rotation amount of the carry roller 23. Consequently, if the rotation amount of the carry roller 23 can be detected, then it is also possible to detect the carry amount of the paper. The rotary encoder 52 is thus provided to detect the rotation amount of the carry roller 23.

<Regarding the Structure of the Rotary Encoder>

FIG. 7 is an explanatory diagram of the structure of the rotary encoder. It should be noted that in this diagram, structural elements that have already been described are assigned identical reference numerals and thus description thereof is omitted.

The rotary encoder 52 has a scale 521 and a detection section 522.

The scale 521 has numerous slits provided at a predetermined pitch. The scale 521 is provided on the carry roller 23. That is, the scale 521 rotates together with the carry roller 23. For example, when the carry roller 23 is rotated such that the paper S is carried by 1/1440 inch, the scale 521 is rotated by one slit with respect to the detection section 522.

The detection section 522 is provided in opposition to the scale 521, and is fastened to the main printer unit side. The detection section 522 has a light-emitting diode 522A, a collimating lens 522B, and a detection processing section 522C. The detection processing section 522C is provided with a plurality of (for instance, four) photodiodes 522D, a signal, processing circuit 522E, and two comparators 522Fa and 522Fb.

The light-emitting diode 522A emits light when a voltage Vcc is applied to it via resistors on both sides, and this light is incident on the collimating lens. The collimating lens 522B turns the light that is emitted from the light-emitting diode 522A into parallel light, and irradiates the parallel light on the scale 521. The parallel light that passes through the slits provided in the scale then passes through stationary slits (not shown) and is incident on the photodiodes 522D. The photodiodes 522D convert the incident light into electric signals. The electric signals that are output from the photodiodes are compared in the comparators 522Fa and 522Fb, and the results of these comparisons are output as pulses. The pulse ENC-A and the pulse ENC-B that are output from the comparators 522Fa and 522Fb become the output of the rotary encoder 52.

<Regarding the Signals of the Rotary Encoder>

FIG. 8A is a timing chart of the waveforms of the output signals when the carry motor 22 is rotating forward. FIG. 8B is a timing chart of the waveforms of the output signals when the carry motor 22 is rotating in reverse.

As shown in these figures, the phases of the pulse ENC-A and the pulse ENC-B are misaligned by 90 degrees both when the carry motor 22 is rotating forward and when it is rotating in reverse. When the carry motor 22 is rotating forward, that is, when the paper S is being carried in the carrying direction, then the phase of the pulse ENC-A leads the phase of the pulse ENC-B by 90 degrees. On the other hand, when the carry motor 22 is rotating in reverse, that is, when the paper S is being carried in the direction opposite the carrying direction, then the phase of the pulse ENC-A trails the phase of the pulse ENC-B by 90 degrees. A single period T of the pulses is the same as the time during which the carry roller 23 is rotated by the interval between slits of the scale 521 (for example, by 1/1440 inch (1 inch equals 2.54 cm)).

The rotation amount of the carry roller 23 can be detected if the controller counts the number of pulse signals, and therefore, the carry amount of the paper can be detected. Further, the rotation velocity of the carry roller 23 can be detected by the controller detecting a single period T of the pulses, and therefore, the speed at which the paper is carried can be detected.

It should be noted that the signals of the linear encoder 51 are the same as the above. In the case of the linear encoder 51, its detection section is provided on the carriage 31 and its linear scale is provided on the main printer unit side. When the carriage 31 moves, a pulsed signal is output from the linear encoder 51. The carriage moves back and forth, and when moving forward, the phase of the pulse ENC-A leads the phase of the pulse ENC-B by 90 degrees, and when it is returning, the phase of the pulse ENC-A trails the phase of the pulse ENC-B by 90 degrees.

===Carriage Unit Control Circuit ===

<Regarding the Configuration of the Carriage Unit Control Circuit>

Figure 9:
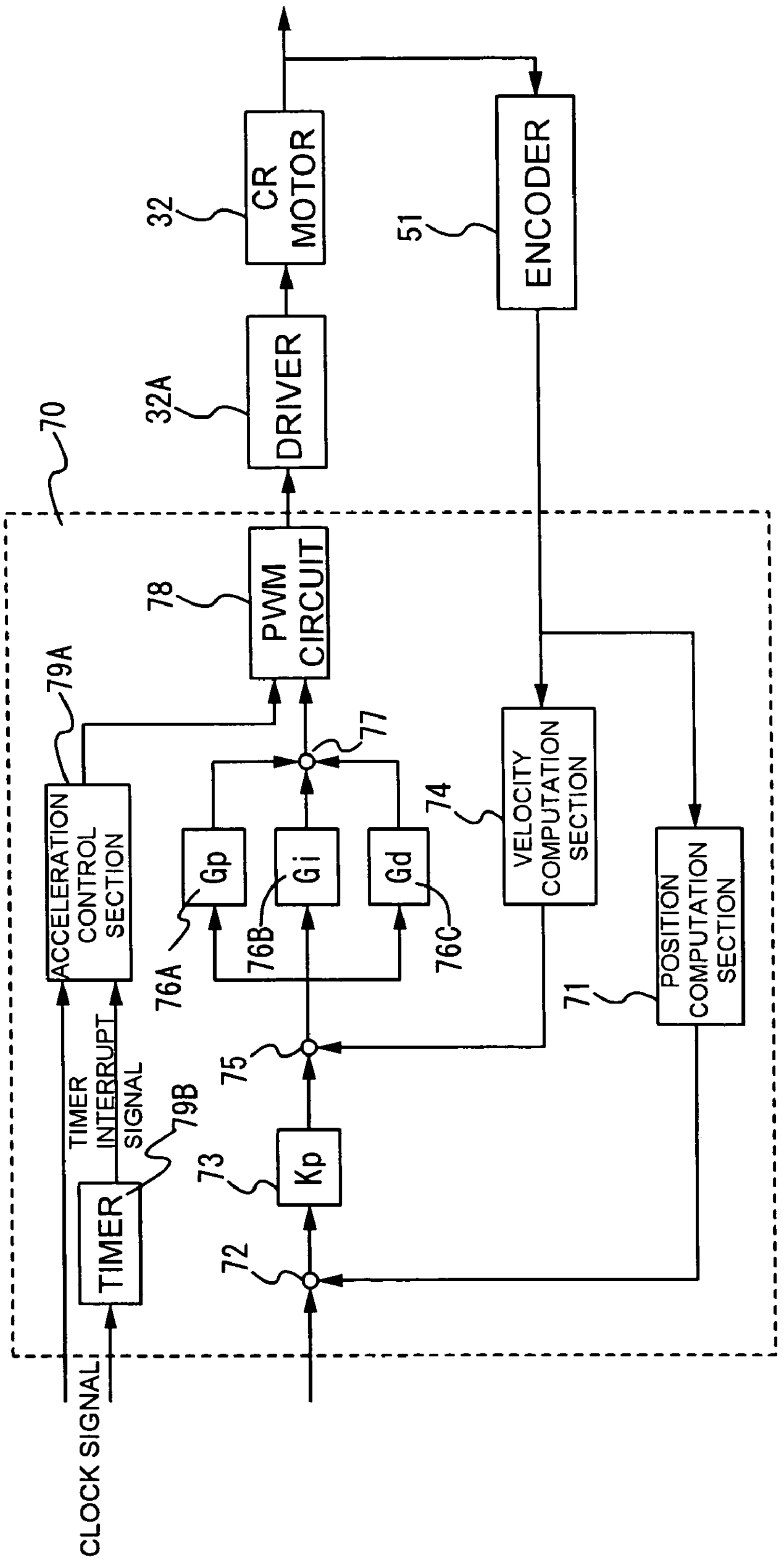
FIG. 9 is a block diagram of a carriage unit control circuit.

FIG. 9 is a block diagram of a carriage unit control circuit 70. The carriage unit control circuit 70 controls the driving of the CR motor 32 (carriage motor) of the carriage unit 30, and is provided in the unit control circuit 64 mentioned above.

The carriage unit control circuit 70 has a position computation section 71, a subtractor 72, a gain 73, a velocity computation section 74, a subtractor 75, a proportional element 76A, an integral element 76B, a derivative element 76C, an adder 77, a PWM circuit 78, an acceleration control section 79A, and a timer 79B.

The position computation section 71 detects the edges of the output pulses of the linear encoder 51, counts that number of edges, and computes the rotation position of the CR motor 32 based on that count number. The position computation section 71 compares two pulsed signals and from this comparison, recognizes whether the CR motor 32 is rotating forward or in reverse, and when a single edge has been detected, it performs counting such as to perform incrementing or decrementing depending on whether the CR motor 32 is rotating forward or in reverse.

The subtractor 72 computes the positional deviation between the target position sent from the CPU 62 and the detection position that has been detected by the position computation section 71. The gain 73 multiplies the positional deviation that is output from the subtractor 72 by a gain Kp, and outputs the target velocity. The gain Kp is determined according to the positional deviation. It should be noted that a table showing the relationship between the value of the gain Kp and the positional deviation is stored on the memory 63.

The velocity computation section 74 computes the rotation velocity of the CR motor 32 based on the output pulse of the linear encoder 51. That is, the velocity computation section 74 measures the time of the pulse period of the output pulse of the linear encoder 51 and computes the rotation velocity of the CR motor 32 based on this pulse period.

The subtractor 75 computes the velocity deviation between the target velocity that has been output from the gain 73 and the detection velocity that has been detected by the velocity computation section 74.

The proportional element 76A multiplies the velocity deviation by a constant Gp, and outputs this as the proportional component. The integral element 76B integrates the values obtained by multiplying the velocity deviation and a constant Gi, and outputs this as an integral component. The derivative element 76C multiplies the difference between the current velocity deviation and the immediately prior velocity deviation by a constant Gd, and outputs this as a derivative component. The computations of the proportional element 76A, the integral element 76B, and the derivative element 76C are performed each period of the output pulse of the linear encoder 51.

The signal values output from the proportional element 76A, the integral element 76B, and the derivative element 76C indicate a duty DX that corresponds to the respective computed results. Here, the duty DX for example indicates that the duty percent is (100×DX/2000)%. In this case, it indicates a duty 100% if DX=2000 and a duty 50% if DX=1000. It should be noted that the value of the signal output from the integral element 76B is expressed also as DXI.

The adder 77 sums the output of the proportional element 76A, the output of the integral element 76B, and the output of the derivative element 76C. The result of this addition is sent to the PWM circuit 78 as a duty signal. The PWM circuit 78 generates a command signal that corresponds to the results of the addition by the adder 77. A driver 22A drives the CR motor 32 based on this command signal.

The driver 22A is provided, for example, with a plurality of transistors, and it applies voltage to the CR motor 32 by turning these transistors ON and OFF in accordance with the command signal from the PWM circuit 78.

The acceleration control section 79A and the timer 79B are used during acceleration control of the CR motor 32. The timer 79B generates a timer interrupt signal at predetermined time intervals based on the clock signal received from the CPU 62. The acceleration control section 79A integrates a predetermined duty DXP each time a timer interrupt signal is received, and outputs the results of this integration to the PWM circuit 78 as a duty signal.

When driving the CR motor 32 such that it accelerates, the PWM circuit 78 outputs a command signal to the CR motor 32 based on the duty signal that is output from the acceleration control section 79A, thereby controlling the CR motor 32. When driving the CR motor 32 at a constant velocity or when reducing the velocity of the CR motor 32, the PWM circuit 78 outputs a command signal to the CR motor 32 based on the duty signal that is output from the adder 77, in order to control the CR motor 32 with PID control.

<Driving the CR Motor: 1>

Figure 10A:
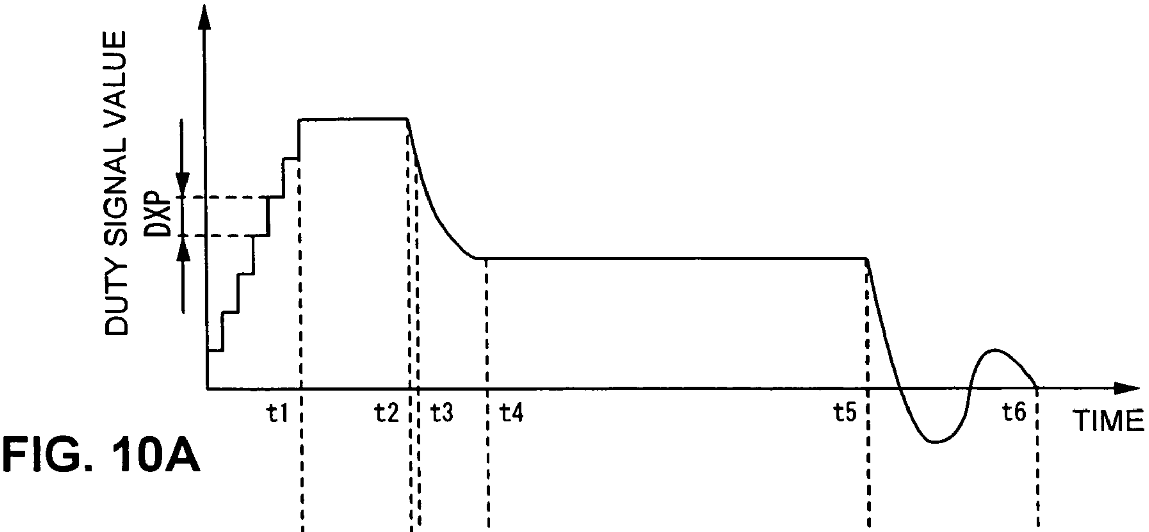
FIG. 10A is a graph plotting the change over time in the duty signal that is input to the PWM circuit.
Figure 10B:
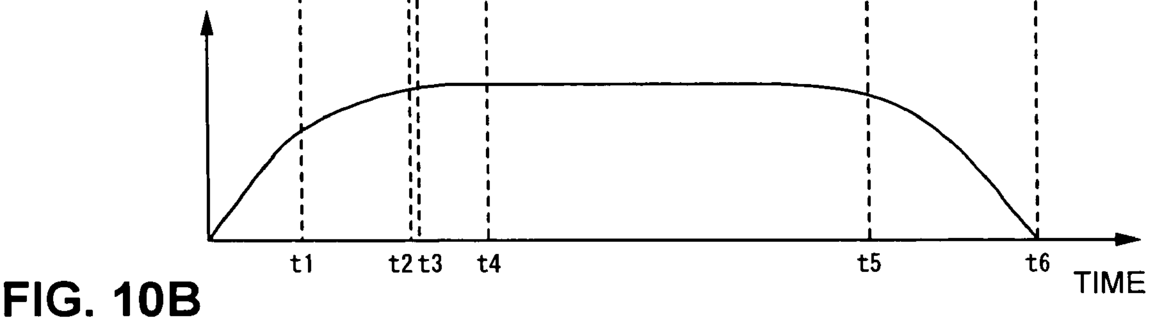
FIG. 10B is a graph showing the change in motor velocity versus time.

FIG. 10A is a graph plotting the change over time of the duty signal input to the PWM circuit 78. FIG. 10B is a graph plotting the change in velocity of the motor. Below, these figures are used to describe the driving of the CR motor.

When an activation command signal for activating the CR motor 32, which is in a stopped state, is sent from the CPU 62 to the carriage unit control circuit 70, an activation initial duty signal whose signal value is DX0 is sent from the acceleration control section 79A to the PWM circuit 78. The activation initial duty signal is a signal that is sent from the CPU 62 to the acceleration control section 79A together with the activation command signal. The activation initial duty signal is then converted into a command signal that corresponds to the signal value DX0 by the PWM circuit 78, and activation of the CR motor 32 is started.

After the carriage unit control circuit 70 has received the activation command signal, a timer interrupt signal is generated from the timer 79B at predetermined time intervals. Each time the acceleration control section 79A receives a timer interrupt signal, it adds (integrates) a predetermined duty DXP to the signal value DX0 of the activation initial duty signal and sends a duty signal, whose signal value has a duty obtained by this addition, to the PWM circuit 78. This duty signal is converted into a command signal corresponding to its signal value by the PWM circuit 78, and the rotation velocity of the CR motor 32 increases. Thus, the value of the duty signal sent to the PWM circuit 78 from the acceleration control circuit 79A rises in a stepwise manner.

The duty integration process of the acceleration control section 79A is performed until the integrated duty reaches a predetermined duty DXS. When the integrated duty reaches the predetermined value DXS at the time t1, then the acceleration control section 79A stops integration, and thereafter, sends duty signals whose signal value is a constant duty DXS to the PWM circuit 78.

Then, when the CR motor 32 reaches a predetermined rotation velocity (see time t2), the acceleration control section 79A performs control to reduce the duty signal that is output to the PWM circuit 78 and thereby reduce the duty percent of the voltage that is applied to the CR motor 32. At this point, the rotation velocity of the CR motor 32 still keeps increasing. Then, at the time t3, the PWM circuit 78 selects the output of the adder 77 and performs PID control. At the point that PID control is begun (t3), the integrated value of the integral element 76B is set to an appropriate value, and the value output by the integral element 76B becomes a predetermined value.

When PID control is started, the carriage unit control circuit 70 multiplies the gain Kp to the positional deviation between the target position and the actual position obtained from the output of the linear encoder 51 to calculate the target velocity. The carriage unit control circuit 70 uses the proportional element 76A, the integral element 76B, and the derivative element 76C to compute the proportional component, the integral component, and the derivative component based on the velocity deviation between this target velocity and the actual velocity obtained from the output of the linear encoder 51, and performs control of the CR motor 32 based on the sum of these computation results. It should be noted that the proportional, integral, and differential computations are performed in synchronization with the rising edge of the output pulse ENC-A of the linear encoder 51, for example. Thus, the rotation velocity of the CR motor 32 is controlled so that it becomes a desired velocity at the time t4.

When the CR motor 32 approaches the target position (time t5), the positional deviation becomes smaller and thus the target velocity also becomes smaller. Thus, the velocity deviation, that is, the output of the subtractor 75, becomes negative, and the CR motor 32 decelerates and stops at the time t6.

===Overview of Heat Production Restriction Control===

The controller 60 calculates the heat-production amount Qpass[Y][V] of the CR motor 32 per dot formation process, and based on this heat-production amount Qpass [Y][V] estimates the temperature of the CR motor 32 and performs heat production restriction control with respect to the CR motor 32 according to the estimated temperature.

The heat-production amount Qpass[Y][V] of the CR motor 32 per dot formation process is calculated as shown below by summing Ibase[Y][V], which is the value of the current when the CR motor 32 is accelerating and decelerating, and Ifuka, which is the value of the current when the CR motor 32 is at constant velocity (it should be noted that tpass[Y][V] is the drive time of the CR motor 32 per dot formation process).

$$Qpass[Y][V]=(Ibase[Y][V]+Ifuka)^2 \cdot tpass[Y][V]$$

For each combination of movement velocity V and movement distance Y, the current value Ibase [Y][V] during acceleration (and deceleration) and the drive time tpass[Y][V] are stored in the memory 63 in advance as an Ibase table and a tpass table, respectively. Then, once the movement velocity V and the movement distance Y have been determined during printing, the controller 60 can find the current value Ibase[Y][V] and the drive time tpass[Y][V] based on these tables.

The current Ifuka that flows to the CR motor 32 during constant velocity differs depending on the load of the CR motor 32, and thus is calculated when the power is turned ON (this is discussed later in the section "Load Measurement").

The controller 60 estimates the temperature of the CR motor 32 based on the heat-production amount Qpass[Y][V] of the CR motor 32 per dot formation process, taking into account the natural heat radiation from the CR motor 32 (this is discussed later in the section "Temperature Estimation Process").

Heat production restriction control is started when the estimated temperature of the CR motor 32 reaches a threshold value. The CR motor 32 and the carry motor 22 are driven in alternation, and thus, with heat production restriction control, a rest period is inserted between the intermittent drives of the CR motor 32 to allow heat to be radiated from the CR motor 32 (this is discussed later in the section "Heat Production Restriction Control").

===Creating the Tables===

The amount of heat produced is generally found with the following formula.

$Q=K \cdot W$ (K is a coefficient for converting a work W into heat)

Here, $W=I^2 \cdot R \cdot t$. Therefore, $Q=I^2 \cdot R \cdot t \cdot K$. Considering the heat produced due to operation of the CR motor 32, R is the resistance of the coil of the CR motor and is a constant. Since Rand K are constants, $Q \propto I^2 \cdot t$. Accordingly, in the following description, $I^2 \cdot t$ is referred to as the heat-production amount (but actually, it is an amount corresponding to the heat produced).

<Creation of the Ibase Table>

FIG. 11A is a graph showing the relationship between time and current value when the motor load is small. FIG. 11B is a graph showing the relationship between time and current value when the motor load is large.

The current value rises during acceleration and is substantially constant in constant-velocity regions because the carriage is moved against the load. The load of the CR motor 32 results from the dynamic friction resistance and the viscosity resistance between itself and sliding portions such as the rail. The constant current value Ifuka in the constant-velocity region of the CR motor 32 is the current value necessary to move the carriage 31 against the load. Thus, as shown in the drawings, the current value Ifuka is a small value when the load is small and a large value when the load is large.

During acceleration, the portion of the current beyond Ifuka (hatched portion in the drawing) corresponds to the inertia portion resulting from the mass M of the carriage 31, and in the same velocity mode (acceleration mode) this is a constant value that depends on the mass M. Accordingly, as shown in FIG. 12, the effective current value Ipass per pass is found by splitting it into the current value Ifuka, which changes depending on the load, and the current value Ibase, which corresponds to the inertia portion dependant on the mass M only in the acceleration and deceleration modes. (It should be noted that when Qpass is the heat-production amount per pass, then the effective current value Ipass is $Qpass=Ipass^2 \times tpass$.) Of these, the current value Ifuka is measured using the same method as the method of load measurement, which is discussed later (it will not be explained here).

FIG. 13 is an explanatory diagram of the Ibase table. The Ibase table stores the current values Ibase[Y][V] during acceleration (and deceleration) in relation to the movement velocity V and the movement distance Y. Each current value Ibase[Y][V] is found experimentally in advance. The method through which these are found is described in detail below.

First, the current value I of the CR motor 32 during one pass is measured sequentially per every brief time t, the current values I that are obtained are squared and multiplied by the brief time t, the values $I^2 \times t$ that are obtained are sequentially integrated, and then the square root of a value obtained by dividing this integrated value by the drive time tpass of the CR motor is calculated to compute the effective current value Ipass per pass. Then, the current value Ifuka that has been obtained by measurement is subtracted from the effective current value Ipass to calculate the current value Ibase (Ibase=Ipass−Ifuka). The effective current Ibase [Y][V] is measured and calculated for all combinations of movement velocity V and movement distance Y, completing the Ibase table. The Ibase table that is created is stored in the memory 63.

<Creating the tpass Table>

FIG. 14 is an explanatory diagram of the tpass table. The tpass table stores values for the drive time tpass[Y][V] of the CR motor 32 per dot formation operation (per pass) in relation to the movement velocity V and the movement distance Y. The drive times tpass are found experimentally in advance for all combinations of the movement velocity V and the movement distance Y, and with these, the tpass table is completed. The tpass table that is created is stored in the memory 63.

===Load Measurement===

The current value necessary for the CR motor 32 to rotate at a constant velocity differs depending on the load that is applied to the CR motor 32. Accordingly, before print processing such as when the power is turned ON, the printer performs load measurement as described below to measure the current value Ifuka flowing into the CR motor 32 when the CR motor 32 is moving at a constant velocity V1.

Figure 15:
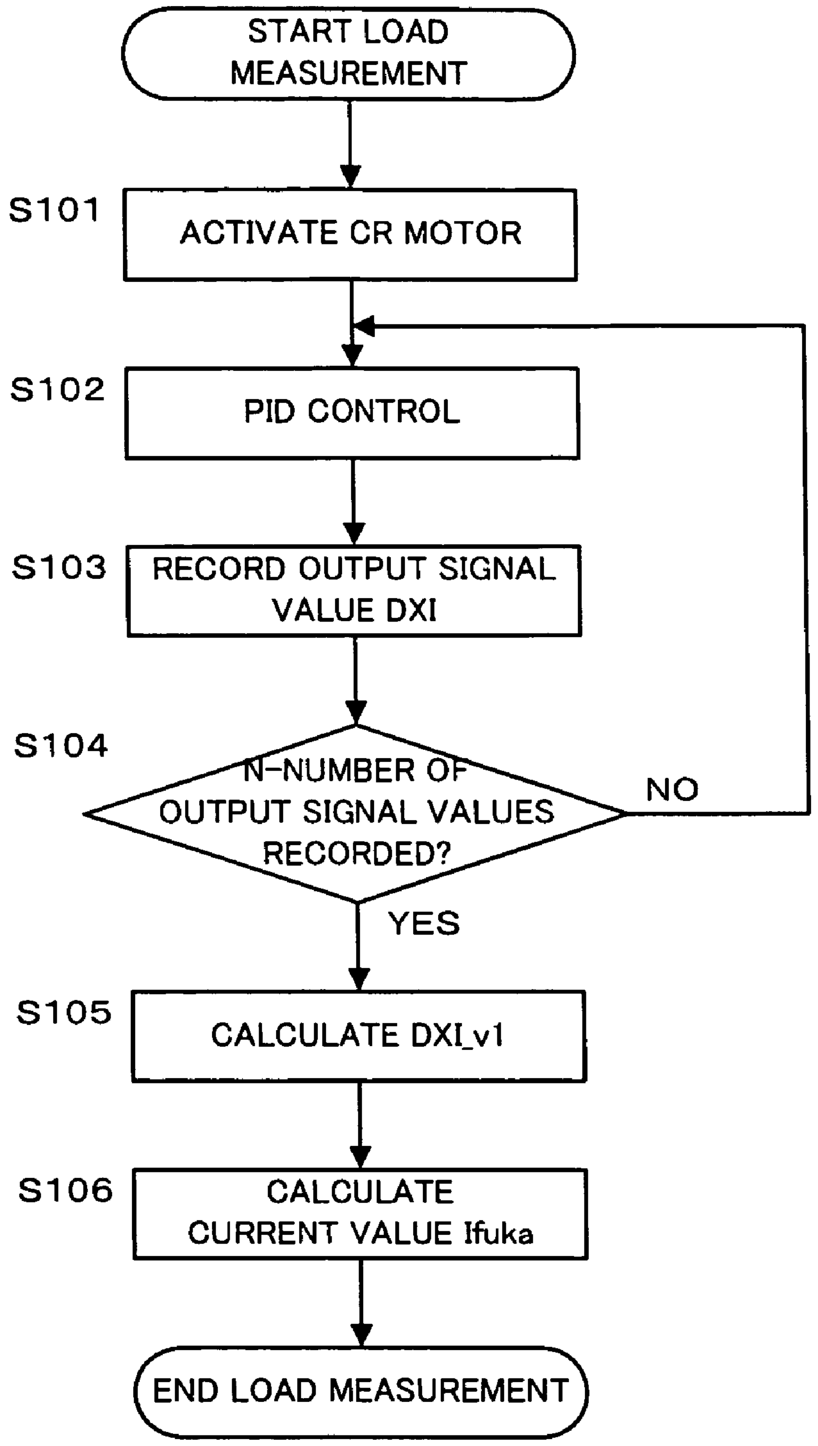
FIG. 15 is a flowchart of the load measurement process.
Figure 16:
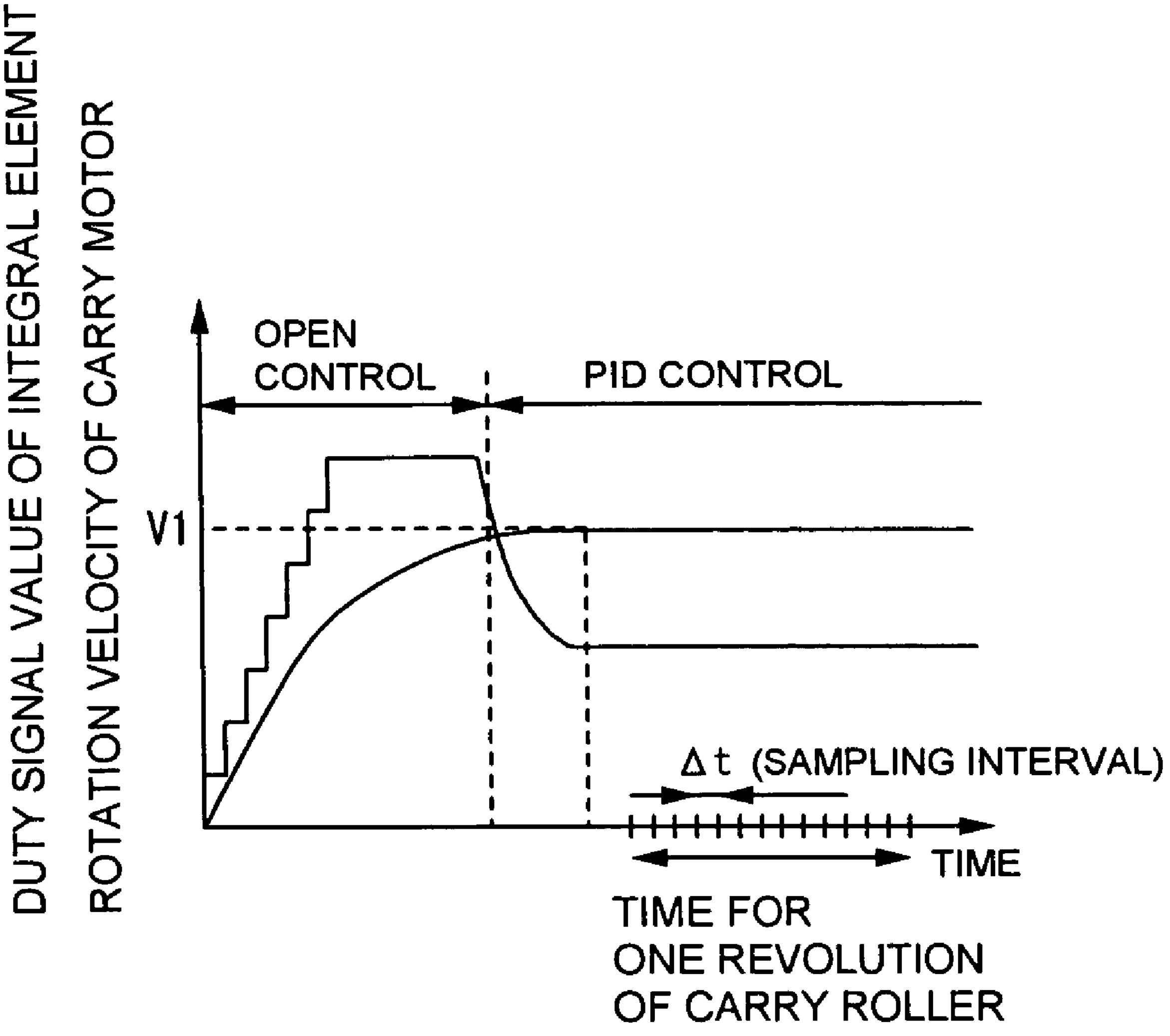
FIG. 16 is a graph plotting the change over time in the duty signal value (output value) of the integral element and the CR motor rotation velocity during the load measurement process.

FIG. 15 is a flowchart of the load measurement process. FIG. 16 is a graph of the change over time in the duty signal value (output value) of the integral element 76B and the CR motor rotation velocity during load measurement processing. The controller 60 controls the carriage unit control circuit in accordance with a program stored on the memory 63 each time the power is turned ON or the ink cartridge is replaced to perform the following processing.

First, the controller 60 activates the CR motor 32 (S101). In the initial acceleration region, the controller 60 performs acceleration control with open control to accelerate the CR motor until the rotation velocity of the CR motor 32 approaches the predetermined target velocity V1.

Next, when the rotation velocity of the CR motor 32 has come close to the target velocity V1, then the controller 60 switches from open control to PID control (S102). When driving of the CR motor 32 is continued through PID control, the difference between the rotation velocity and the target velocity V1 of the CR motor 32 becomes smaller.

When the difference between the rotation velocity of the CR motor 32 and the target velocity V1 becomes equal to or smaller than a predetermined value and the output signal value DXI of the integral element 76B becomes a substantially constant value, then the controller 60 records the output signal value DXI of the integral element 76B at a sampling interval Δt (S103).

Once N-pieces of output signal values have been recorded from the start of sampling (YES in S104), then the controller 60 calculates the mean value DXI_v1 of the N-pieces of output signal values that have been sampled (S105).

When Vp is the constant voltage applied to the CR motor 32, R is the resistance of the CR motor 32, V1 is the rotation velocity of the CR motor, Ifuka is the current flowing into the CR motor 32 at the rotation velocity V1, DXI_v1 is the mean value of the output signal values of the integral element 76B obtained through load measurement, kE is the motor counter-electromotive voltage coefficient, and the integral element output value that gives 100% in duty percent is 2000, then the following equation applies.

$$Ifuka=\{Vp\times(DXI\_v1/2000)-kE\times V1\}/R$$

Consequently, if the output value DXI_v1 of the integral element 76B is found through load measurement, then the current value Ifuka flowing to the CR motor 32 when driving the carriage at the constant velocity V1 can be found (S106).

However, because there are individual differences in CR motors 32, the actual values of Vp, kE, and R of the CR motor will differ from the Vp, kE, and R used for the above calculation. Thus, the Ifuka calculated through the above calculation includes error due to this variation caused by individual differences between motors.

Accordingly, in this embodiment, when finding the current value Ifuka, a correction value Ifuka_sub amounting to the calculation error is added to the current value Ifuka obtained through the above equation. The method for calculating this correction value Ifuka_sub is discussed later.

===Temperature Estimation Process===

<Heat-Production Amount Qpass per Dot Formation Process (per Pass)

Figures 17, 18:
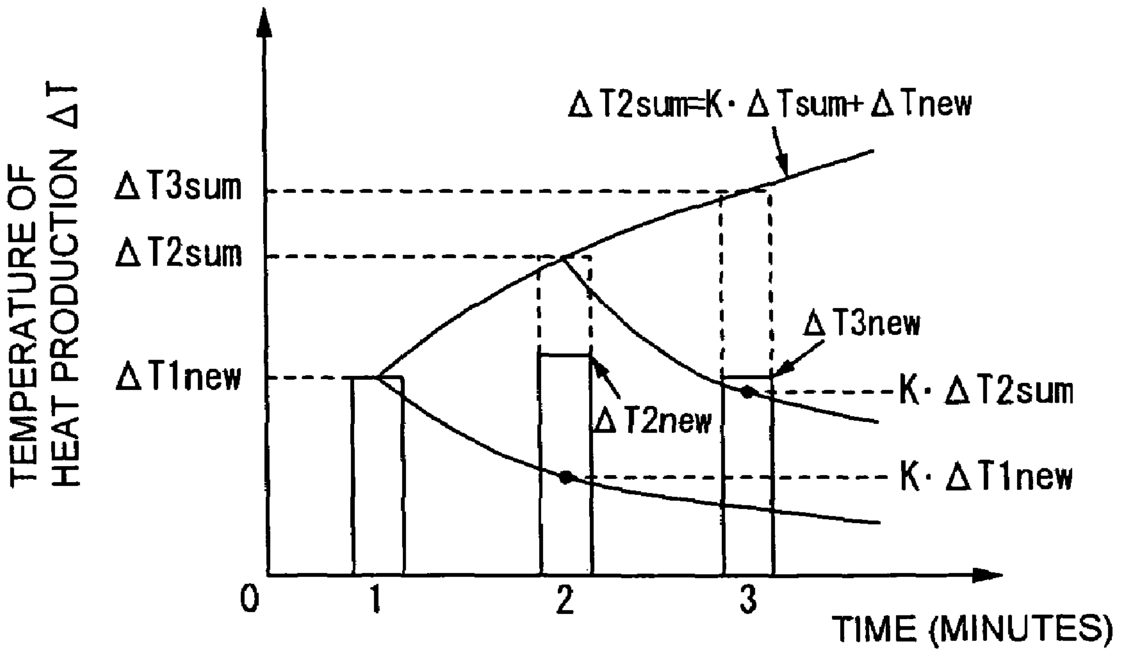
FIG. 17 shows the Qpass table.
FIG. 18 is a graph showing the total heat-production temperature (total heat-production value) resulting from the heat produced by the CR motor, taking into account the natural heat radiation as time passes.

FIG. 17 is an explanatory diagram of the Qpass table. The Qpass table stores the heat-production amount Qpass[Y][V] of the CR motor per dot formation process (per pass) in relation to the movement velocity V and the movement distance Y. Each amount of heat-production amount Qpass [Y][V] is calculated through the following formula.

$$Qpass[Y][V]=(Ibase[Y][V]+Ifuka[Y][V])^2\times tpass[Y][V]$$

The Qpass table is created as discussed below. The Ibase table and the tpass table are created in the factory before the printer is shipped. The Ibase table and tpass table that are created are stored in the memory 63 in advance and then the printer is shipped. When a user who has purchased the printer sets up the printer and turns the power ON, load measurement is performed to calculate the current value Ifuka. Then, the controller 60 calculates the heat-production amount Qpass [Y][V] of the CR motor per dot formation process (per pass) based on the Ibase [Y][V] obtained by referencing the Ibase table, the tpass[Y][V] obtained by referencing the tpass table, and the current value Ifuka that has been measured through load measurement. The controller 60 next calculates the Qpass [Y][V] for all combinations of the movement velocity V and the movement distance Y, and creates a Qpass table.

It should be noted that strictly speaking, the load on the CR motor 32 is different when the carriage 31 is moving forward and when it is moving in reverse, and thus in practice there are two tables each, one for the forward pass and one for the return pass, of the Ibase table, the tpass table, the Ifuka, and the Qpass table. In this embodiment, however, to simplify the explanation, no distinction is made between when moving forward and when moving in reverse, and a single table is used in common for both.

<Estimating the Heat-Production Temperature>

The temperature estimation process performed after the Qpass table has been created when the printer has been turned ON is described next.

In each dot formation process, the controller 60 references the Qpass table and obtains the heat-production amount Qpass at that time based on the movement temperature V and the movement distance Y. The controller 60 obtains the heat-production amount Qpass for each dot formation process (each pass).

Then, when the printer performs print processing, the CR motor repeatedly generates heat as it repeatedly moves the carriage 31 back and forth, and thus the controller 60 integrates the successively obtained heat-production amount Qpass.

Here, one minute is taken as a unit time Tbox, and each heat-production amount Qpass during the unit time is integrated to calculate the heat-production amount Qsigma for the unit time. The initial value of the heat-production amount Qsigma is 0 before calculation, and is reset each time the unit time Tbox has elapsed. Consequently, the heat-production amount Qsigma is "0" when the carriage 31 is not driven even once in a minute.

Next, the heat-production amount Qsigma for one minute is converted into heat-production temperature (heat-production value) ΔTnew. ΔTnew is found by the equation ΔTnew=Ka·Qsigma. Here, Ka is a conversion coefficient for converting the heat-production amount Q to heat-production temperature ΔT, and is a value found by preliminary experiments. The heat-production amount Q=κ·ΔT and Q is proportional to $Io^2\cdot R\cdot t$. Therefore, when assuming that the heat-production temperature of the motor is ΔTo when an effective current value Io is applied for t seconds in a preliminary experiment, then the heat-production temperature ΔTnew that is obtained when the effective current Irms is applied for t seconds can be expressed through the following equation.

$$\Delta Tnew=(\Delta To/Io^2)\cdot Irms^2$$

$$\therefore \Delta Tnew=\{(\Delta To/Io^2\cdot Tbox)\}\times Qsigma$$

Here, when Ka is substituted for $\{(\Delta To/Io^2\cdot Tbox)\}$, then ΔTnew=Ka·Qsigma. From preliminary experiment of measuring the heat-production temperature ΔT of the motor when the effective current Io is applied for t seconds, if, for example, ΔTo=20 deg. is measured at Io=200 mA, then Ka=0.0000083 because the unit time Tbox=60 seconds. Thus, the heat-production temperature ΔTnew per unit time Tbox can be expressed by ΔTnew=Ka·Qsigma using the constant (conversion coefficient) Ka having the above-mentioned value.

FIG. 18 is a graph showing the total heat-production temperature (total heat-production value) resulting from the heat produced by the CR motor 32, taking into consideration the natural radiation of heat over time. As shown in the graph, ΔT1new is the heat-production temperature (heat-production value) of the CR motor 32 due to the passing current in the first minute, ΔT2new is the heat-production temperature due to the applied current in the next minute, and ΔT3new is the heat-production temperature due to the applied current in the next minute following that. The initial heat-production temperature ΔT1new falls along a heat radiation curve as time passes, and after one minute drops to ΔT1old due to the natural radiation of heat. Thus, the total heat-production temperature ΔT2sum of the second minute is expressed by ΔT2sum=ΔT1old+ΔT2new. The total heat-production temperature ΔT2sum of the second minute falls along a heat radiation curve as time passes, and after one minute drops to ΔT2old due to the natural radiation of heat. Thus, the total heat-production temperature ΔT3sum of the third minute is expressed by ΔT3sum=ΔT2old+ΔT3new.

Here, the heat-production temperature ΔTold, which is arrived at after one minute by ΔTsum falling along a heat radiation curve, is expressed using the heat radiation coefficient K as ΔTold=K·ΔTsum. Thus, the latest total heat-production temperature ΔTsum of the motor is calculated by adding the latest heat-production temperature ΔTnew to the value obtained by multiplying the previous total heat-production temperature ΔTsum by the heat radiation coefficient K, and can be found by the formula ΔTsum=K·ΔTsum+ΔTnew. It should be noted that the total heat-production temperature ΔTsum corresponds to the value calculated by converting the heat buildup amount due to the generation of heat by the CR motor 32 into the heat-production temperature. Consequently, from the perspective of the heat quantity, the current heat buildup amount can be found by adding the current heat-production amount to the previous heat buildup amount.

Figure 19:
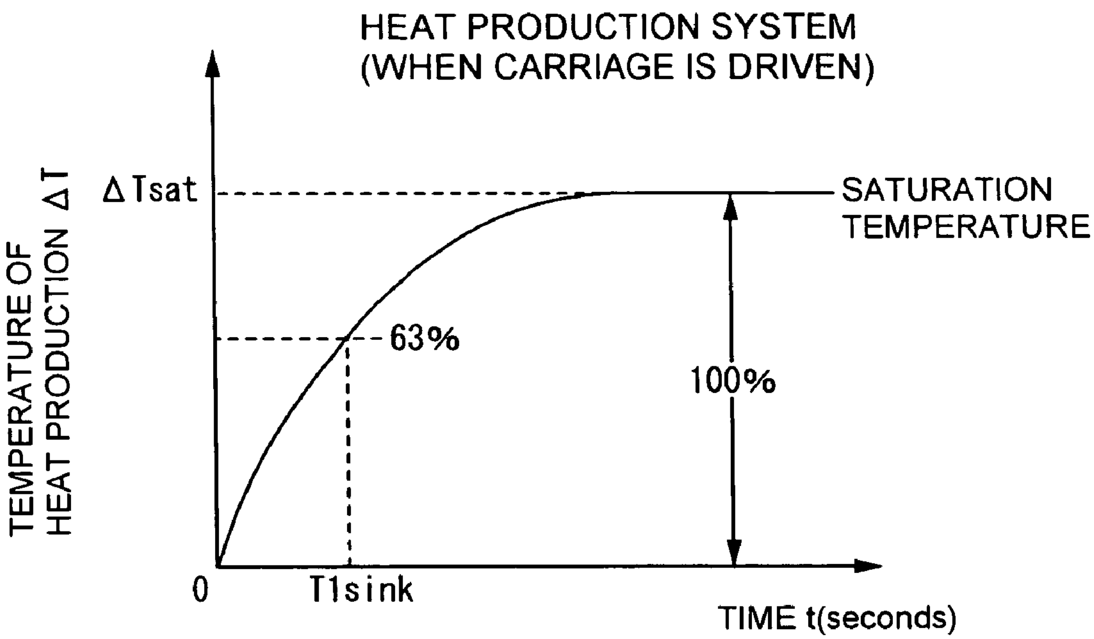
FIG. 19 is a graph showing the heat radiation temperature curve of the heat-production system.
Figure 20:
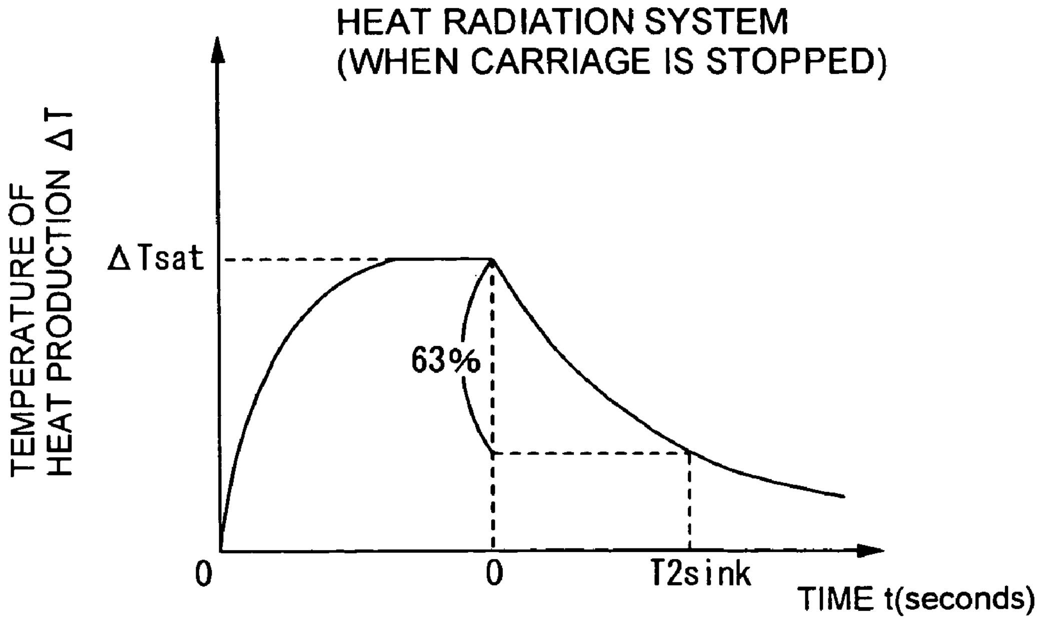
FIG. 20 is a graph showing the heat radiation temperature curve of the heat-radiation system.

The heat radiation coefficient K is obtained by preliminary experiment and is set as illustrated below. First, the system of the printer includes a heat-production system of the heat produced while driving the carriage, which is shown by the temperature curve in FIG. 19, and a heat-radiation system of the heat radiated while the carriage is stopped, which is shown by the temperature curve in FIG. 20. The heat-production system and the heat-radiation system are first-order lag systems, and thus the temperature at an arbitrary time t can be expressed as exp(−t/T), T being the time constant. In the heat-production system, first, a saturation heat-production temperature Tsat is obtained experimentally, and the time at which the temperature reaches a value that is 63% of the saturation temperature Tsat becomes the heat-production time constant T1sink of the system of the printer. In the heat-radiation system, the time, starting from the point of heat saturation and during the period that the temperature drops from the saturation heat-production temperature at the carriage-stop point back to room temperature, until the temperature reaches a value that is 63% lower than the saturation temperature becomes a heat-radiation time constant T2sink of the system of the printer. The time constants T1sink and T2sink both are found experimentally.

The heat-production system and the heat-radiation system both are first-order lag systems. Therefore, if the temperature exp(−t/T) for a given time t becomes K times after the unit time Tbox of 60 seconds has elapsed, then the following equation holds:

$$\exp(-(t+60)/T)=K\cdot\exp(-t/T)$$

Thus, the heat radiation coefficient K at 60 seconds can be expressed as follows.

$$K=\exp(-60/T)$$

When the heat-production time constant T1sink found by experiment is used as the time constant T in the above formula, it is possible to obtain the heat radiation coefficient K=exp(−60/T1sink) in the heat-production system. When the heat-radiation time constant T2sink found by experiment is used as the time constant T in the above formula, it is possible to obtain the heat radiation coefficient K=exp(−60/T2sink) in the heat-radiation system.

In this embodiment, the carriage movement number Ncr per unit time Tbox (=60 seconds) is counted by a counter, and when Ncr is equal to or greater than a set number No that has been set in advance, it is determined that the system is in the heat-radiation system while the carriage is being driven, and the heat radiation coefficient K using the heat-production time constant T1sink is used. On the other hand, when Ncr is less than the set number No, it is determined that the system is in the heat-radiation system while the carriage is stopped, and the heat radiation coefficient K using the heat-radiation time constant T2sink is used. Thus, the total heat-production temperature ΔTsum is calculated as K·ΔTsum when 60 seconds have elapsed, using the heat radiation coefficient K corresponding to the system for the time.

When the printer is turned OFF, the heat-production temperature (heat-production value) ΔTsum is converted into one byte and stored in the EEPROM as one byte of data. That is, it is turned into one byte using a single-byte coefficient EEdiv to calculate ΔTsumEE=ΔTsum/EEdiv. Then, when the printer is turned ON, the last heat-production value ΔTsumEE (one byte) when the printer was operated the last time is obtained from the EEPROM and combined with the sequence calculating unit to compute ΔTsum=ΔTsumEE·EEdiv. That value is obtained as the current heat-production temperature and set as the initial value for ΔTsum. Of course, it is also possible to use backup power after powering down to continue calculating ΔTsum until ΔTsum falls to a predetermined temperature (for example, 10° C.).

The controller 60 stores the total heat-production temperature ΔTsum that has been calculated in a memory 63 such as a RAM. The total heat-production temperature ΔTsum becomes the estimated temperature of the CR motor. Then, when the estimated temperature of the CR motor exceeds a predetermined threshold value, heat production restriction control is started. That is, the controller 60 determines whether or not to perform the heat production restriction control based on the total heat-production temperature ΔTsum.

===Heat Production Restriction Control===

Figures 21A, 21B:
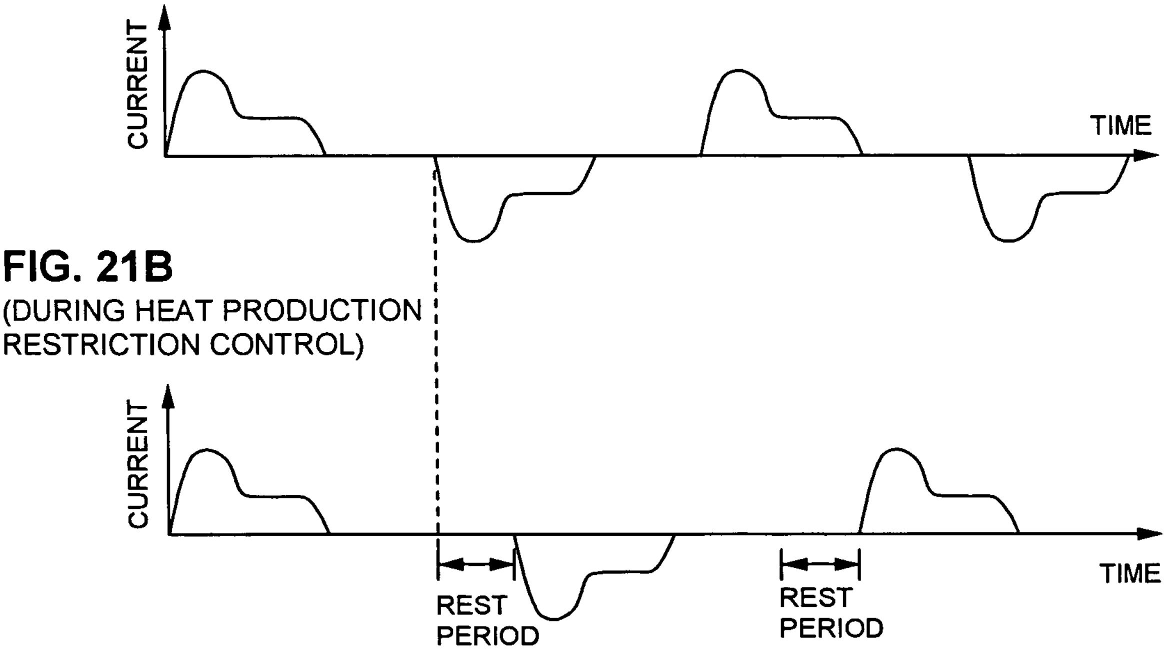
FIG. 21A is an explanatory diagram of the normal change in CR motor current over time.
FIG. 21B is an explanatory diagram of the change over time in CR motor current during heat production restriction control.

FIG. 21A is an explanatory diagram of the change over time of the current of the CR motor 32 during normal operation (before performing heat production restriction control). FIG. 21B is an explanatory diagram of the change over time of the current of the CR motor 32 during heat production restriction control. It should be noted that the current of the CR motor 32 alternates between positive and negative in order for the carriage 31 to alternately repeat forward movement and return movement.

During normal operation, the controller 60 intermittently drives the CR motor 32 at a predetermined interval. It should be noted that the between the intermittent driving of the CR motor 32, the carry motor 22 is driven to perform the carry operation.

When intermittent driving of the CR motor 32 is continued, the temperature of the CR motor 32 rises. However, when the CR motor 32 has risen to a high temperature, there are quality concerns that occur in the CR motor 32. On the other hand, when intermittent driving of the CR motor 32 is continued, the total heat-production temperature ΔTsum for estimating the temperature of the CR motor 32 also rises.

Accordingly, in this embodiment, when the total heat-production temperature ΔTsum has come to exceed a predetermined threshold value, the controller 60 performs heat production restriction control while driving the CR motor 32.

Heat production restriction control is control in which a rest period is inserted between the intermittent drives of the CR motor 32 to increase the interval between the intermittent drives of the CR motor 32. With heat production restriction control, the heat-production amount Qsigma per unit time Tbox (=60 seconds) becomes small and the latest heat-production temperature ΔTnew for one minute during heat production restriction control becomes small, so that the total heat-production temperature ΔTsum becomes lower as time elapses, because ΔTsum=K·ΔTsum+ΔTnew. In other words, due to heat production restriction control, the generation of heat by the CR motor is inhibited to prevent the CR motor from becoming high temperature.

Incidentally, when heat production restriction control is performed, the interval at which the CR motor 32 is driven is widened and this slows the printing speed, making the time required to print a single sheet of paper longer. For that reason, if heat production restriction control is performed when the actual temperature of the CR motor 32 is low (that is, when the estimated temperature of the CR motor 32 is calculated higher than the actual temperature), then unnecessary heat production restriction control is performed, and this sacrifices printing speed.

In particular, because there is individual variation in the voltage Vp, the resistance R, and the motor counter-electromotive voltage coefficient kE of the CR motor, finding the heat-production amount by calculating Ifuka using standard Vp, R, and kE values results in a large gap between the estimated temperature and the actual temperature and causes heat production restriction control to be performed unnecessarily.

Accordingly, in the present embodiment, in order to reduce the error due to individual motor differences, when calculating the current value Ifuka, a correction value Ifuka_sub is calculated and this correction value Ifuka_sub, which is the computation error amount, is added to the current value Ifuka calculated using standard Vp, R, and kE.

===Correction Value Ifuka_sub===

In the following description, Vp represents the standard voltage value of the CR motor, and Vp' represents the actual voltage value of the CR motor (the same applies to the resistance R and the motor counter-electromotive voltage coefficient kE). The standard values such as the voltage value are already known. On the other hand, the actual value of the voltage, for example, varies for each motor within the design range.

<Regarding the Correction Value Ifuka_sub>

When the CR motor 32 is driven at a constant velocity V, the current Ifuka that flows through the CR motor 32 is expressed as below.

$$Ifuka=\{Vp\times(DXI/2000)-kE\times V\}/R \quad \text{(Formula 1)}$$

Variation between individual motors is taken into account in measurement using load measurement mentioned above, and thus when Ifuka_v1 is the current that flows into the CR motor 32, the output signal value of the integral element 76B is DXI_v1' and is expressed as below.

$$DXI\_v1'=(R'\times Ifuka\_v1'+kE'\times V1)\times 2000/Vp' \quad \text{(Formula 2)}$$

Because the Vp', kE', and R' are not known for each motor, to calculate the current value using the standard values (Vp, kE, R), the current Ifuka_v1' flowing into the CR motor 32 is calculated by the following equation.

$$Ifuka\_v1'=\{Vp'\times(DXI\_v1'/2000)-kE'\times V1\}/R' \quad \text{(Formula 3)}$$

As described above, because the Vp', kE', and R' of each individual motor are not known, it is not possible to calculate Ifuka_v1' directly. Thus, if the current value is calculated by substituting the standard values (Vp, kE, R) for Vp', kE', and R in Formula 3 above, then the current value that is calculated will include error.

Accordingly, in this embodiment, the correction value Ifuka_sub is used to calculate Ifuka_v1, which is approximate to the actual current value Ifuka_v'.

$$Ifuka\_v1=\{Vp\times(DXI\_v1/2000)-kE\times V1\}/R+Ifuka\_sub \quad \text{(Formula 4)}$$

This correction value Ifuka_sub is a unique value for each motor. Accordingly, in the factory where the printer is manufactured, the following method is used to obtain the correction value Ifuka_sub for each printer that is manufactured and the respective correction values Ifuka_sub are stored in the memory 63 of the respective printers. Then, when load measurement is performed by the user who has purchased the printer, the controller 60 uses the correction value Ifuka_sub stored in the memory 63 to calculate the correction value Ifuka using the Formula 4 above.

<Regarding Calculation of the Correction Value Ifuka_sub>

(1) Creation of the Correction Value Calculation Function

Figure 22A:
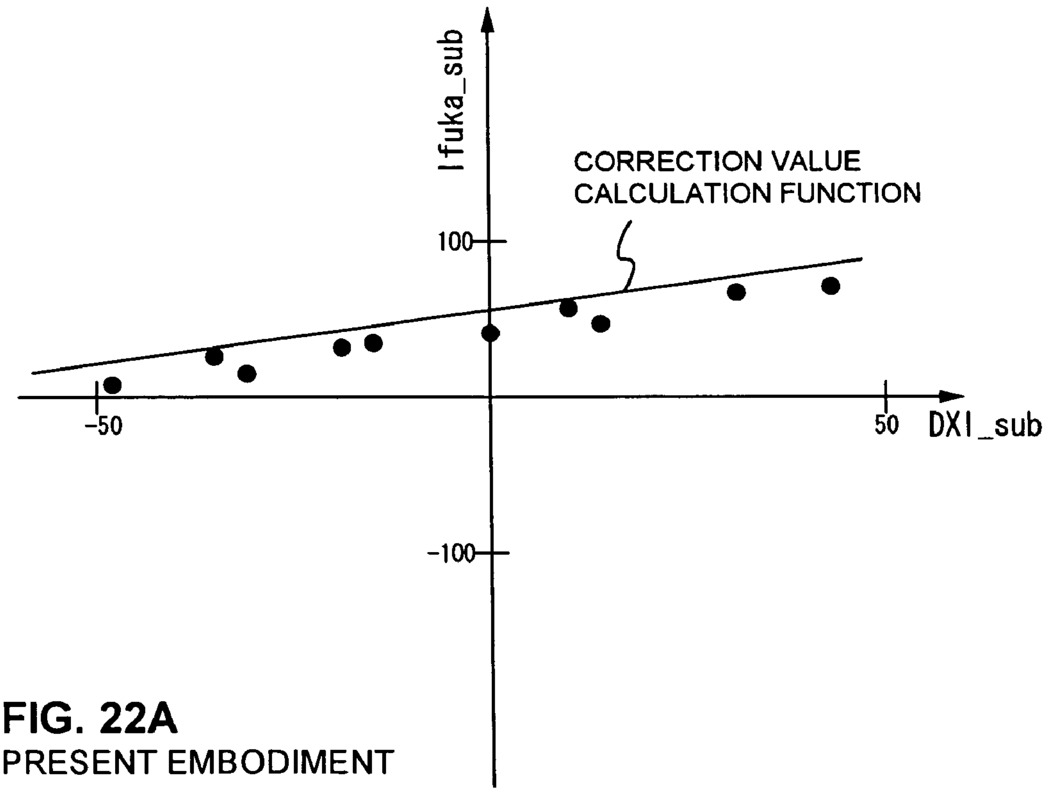
FIG. 22A is an explanatory diagram of the correction value calculation function of the present embodiment.

FIG. 22A is an explanatory diagram of the correction value calculation function of the present embodiment. In this embodiment the correction value Ifuka_sub is calculated according to this correction value calculation function. The correction value calculation function is created as described below.

In the case of a standard CR motor, the output value DXI of the integral element 76B is as follows.

$$DXI=(R\times Ifuka+kE\times V)\times 2000/Vp \quad \text{(Formula 5)}$$

Here, assume that Ifuka_v1 is the load current value of the CR motor at velocity V1, and Ifuka_v2 is the load current value of the CR motor at velocity V2. These load current values are known to be within a predetermined range due to the design of the printer. Here, the load current value Ifuka_v1 and load current value Ifuka_v2 when the load on the CR motor is greatest are used in performing the following calculations.

In the case of the standard CR motor, the output signal value DXI_v1 and output signal value DXI_v2 of the integral element 76B at the respective velocities are expressed as below.

$$DXI\_v1=(R\times Ifuka\_v1+kE\times V1)\times 2000/Vp \quad \text{(Formula 6)}$$

$$DXI\_v2=(R\times Ifuka\_v2+kE\times V2)\times 2000/Vp \quad \text{(Formula 7)}$$

Combining these two formulas gives the following.

$$DXI\_v1+DXI\_v2=\{R\times(Ifuka\_v1+Ifuka\_v2)+kE\times(V1+V2)\}\times2000/Vp \quad \text{(Formula 8)}$$

Taking variations in motor properties into consideration, the sum of the output signal value DXI_v1' and output signal value DXI_v2' of the integral element 76B for the load current value Ifuka_v1 and the load current value Ifuka_v2 are expressed as below.

$$DXI\_v1'+DXI\_v2'=\{R'\times(Ifuka\_v1+Ifuka\_v2)+kE'\times(V1+V2)\}\times2000/Vp' \quad \text{(Formula 9)}$$

The difference between the sum of the output signal value DXI_v1 and output signal value DXI_v2 of the integral element 76B in the case of the standard motor and the sum of the output signal value DXI_v1' and output signal value DXI_v2' of the integral element 76B taking into consideration the variation in motor properties is referred to as DXI_sub. That is, DXI_sub is expressed as follows.

$$DXI\_sub=(DXI\_v1+DXI\_v2)-(DXI\_v1'+DXI\_v2')=\{R\times(Ifuka\_v1+Ifuka\_v2)+kE\times(V1+V2)\}\times2000/Vp-\{R'\times(Ifuka\_v1+Ifuka\_v2)+kE'\times(V1+V2)\}\times2000/Vp' \quad \text{(Formula 10)}$$

Next, taking Ifuka_v1 as the load current value of the CR motor at velocity V1, and taking variation due to motor properties into account, the output signal value DXI_v1' of the integral element 76B is found as follows.

$$DXI\_v1=(R'\times Ifuka\_v1+kE'\times V1)\times2000/Vp' \quad \text{(Formula 11)}$$

With load measurement discussed above, if DXI_v1 ' is the output signal of the integral element 76B, then the property values of a standard motor (Vp, kE, R) are used to calculate the load current value. When Ifuka_v1' is the load current value at this time, then the load current value Ifuka_v1' that is calculated is expressed by the following equation.

$$Ifuka\_v1'=\{Vp\times(DXI\_v1'/2000)-kE\times V1\}/R \quad \text{(Formula 12)}$$

Accordingly, the difference between Ifuka_v1 and the Ifuka v1' in the above equation, which is calculated based on Ifuka_v1, is referred to as Ifuka_sub. That is, Ifuka_sub is expressed by the following formula.

$$Ifuka\_sub=Ifuka\_v1-Ifuka\_v1'=Ifuka\_v1-(\{Vp\times(DXI\_v1'/2000)-kE\times V1\}/R) \quad \text{(Formula 13)}$$

The actual voltage value Vp' of the motor fluctuates within a range of 95% to 105% of the voltage value Vp of the standard motor. The actual counter-electromotive voltage coefficient kE' of the motor fluctuates within a range of 90% to 110% of the counter-electromotive voltage coefficient kE of the standard motor. Further, the actual resistance R' of the motor fluctuates within a range of 90% to 110% of the resistance R of the standard motor.

Accordingly, DXI_sub (Formula 10) and Ifuka_sub (Formula 13) are calculated using a total of 27 combinations of three voltage values Vp' (95%, 100%, 105%), three counter-electromotive voltage coefficients kE' (90%, 100%, 110%), and three resistance values R' (90%, 100%, 110%). (It should be noted that the DXI_v1' calculated through Formula 11 is used for DXI_v1' in Formula 13.) These 27 points are plotted on a graph, taking DXI_sub as the X-axis and Ifuka_sub as the Y-axis.

In this embodiment, the 27 plotted points line up on a substantially straight line. The correction value calculation function expressed in the below expression is created such that the correction value is above the plotted points.

$$Ifuka\_sub=a\times DXI\_sub+b$$

For example, in the case of the correction value calculation function shown in the drawing, a=0.7 and b=53.9. The printer manufacturer stores the correction value calculation function that has been created in the database of the computers managing the printer manufacturing line.

(2) Determining the Correction Value Ifuka_sub of Each Printer

Next, the correction value Ifuka_sub is determined for each printer on the printer manufacturing line. Here, the property values of the CR motor of each of the printers (Vp', kE', R') are not known. It should be noted that the load current values Ifuka_v1 and Ifuka_v2 are known to be within a predetermined range due to the design of the printer, and thus the values of the load current value Ifuka_v1 and the load current value Ifuka_v2 when the load on the CR motor is a maximum are used.

First, for each individual printer, the output signal value DXI_v1' of the integral element 76B when the CR motor is rotating at the velocity V1 and the output signal value DXI_v2' of the integral element 76B when the CR motor is rotating at the velocity V2 are measured.

It is possible to calculate the sum of the output signal DXI_v1 and the output signal DXI_v2 of the integral element 76B based on the load current value Ifuka_v1 and the load current value Ifuka_v2 using the property values of the standard motor (Vp, kE, R) as below.

$$DXI\_v1+DXI\_v2=\{R\times(Ifuka\_v1+Ifuka\_v2)+kE\times(V1+V2)\}\times2000/Vp \quad \text{(Formula 14)}$$

Then, as illustrated by the following formula, the difference between the sum of the output signal DXI_v1 and the output signal DXI_v2 calculated using Formula 14 and the sum of the output signal value DXI_v1' and the output signal value DXI_v2' that have been measured is calculated to find DXI_sub.

$$DXI\_sub=(DXI\_v1+DXI\_v2)-(DXI\_v1'+DXI\_v2) \quad \text{(Formula 15)}$$

The correction value Ifuka_sub is determined for each individual printer based on the DXI_sub that is calculated for each printer and the correction value calculation function in the database of the printer manufacturing line. It should be noted that DXI_v1+DXI_v2 calculated with Formula 14 are constants that are not dependant on the individual differences of the printers. Thus, DXI_sub is a value calculated based on the sum of the output signal value DXI_v1' and the output signal value DXI_v2' that are measured.

The Ifuka_sub that has been determined is stored in the memory 63 of the respective printer. The printer is then shipped from the factory and ends up arriving to the user.

When the printer performs printing due to commands by the user, the controller 60 drives the CR motor 32 through PWM control. Since PWM control is performed, the current Ifuka supplied to the CR motor 32 cannot be measured directly. Accordingly, the load measurement discussed earlier is performed by the user when the printer is turned ON to measure the actual output signal value DXI' of the integral element 76B, and the current Ifuka supplied to the CR motor 32 is calculated based on this measured value. However, in load measurement, the computations are made using the property values of the standard motor (Vp, kE, R), and thus the calculated value includes error due to variation resulting from the individual differences between motors.

Accordingly, in this embodiment, the controller 60 adds the correction value Ifuka_sub of the calculation error amount that is stored in the memory 63 to the Ifuka calculated before printing under control of the user. That is, in this embodiment, Ifuka is calculated as follows.

$$Ifuka\_v1=\{Vp\times(DXI\_v1'/2000)-kE\times V1\}/R+Ifuka\_sub$$

The present embodiment allows the value of the current that is actually supplied to the CR motor 32 of the printer to be calculated with high precision.

Further, in the present embodiment, the controller 60 performs temperature estimation and heat production restriction control based on the current value Ifuka that is obtained by addition of the correction value Ifuka_sub. Thus, the actual temperature of the CR motor can be estimated accurately. Further, because heat production restriction control is performed according to the actual temperature of the CR motor, it is possible to avoid performing unnecessary heat production restriction control, thereby allowing the printing speed to be increased.

(3) Comparative Example

Figure 22B:
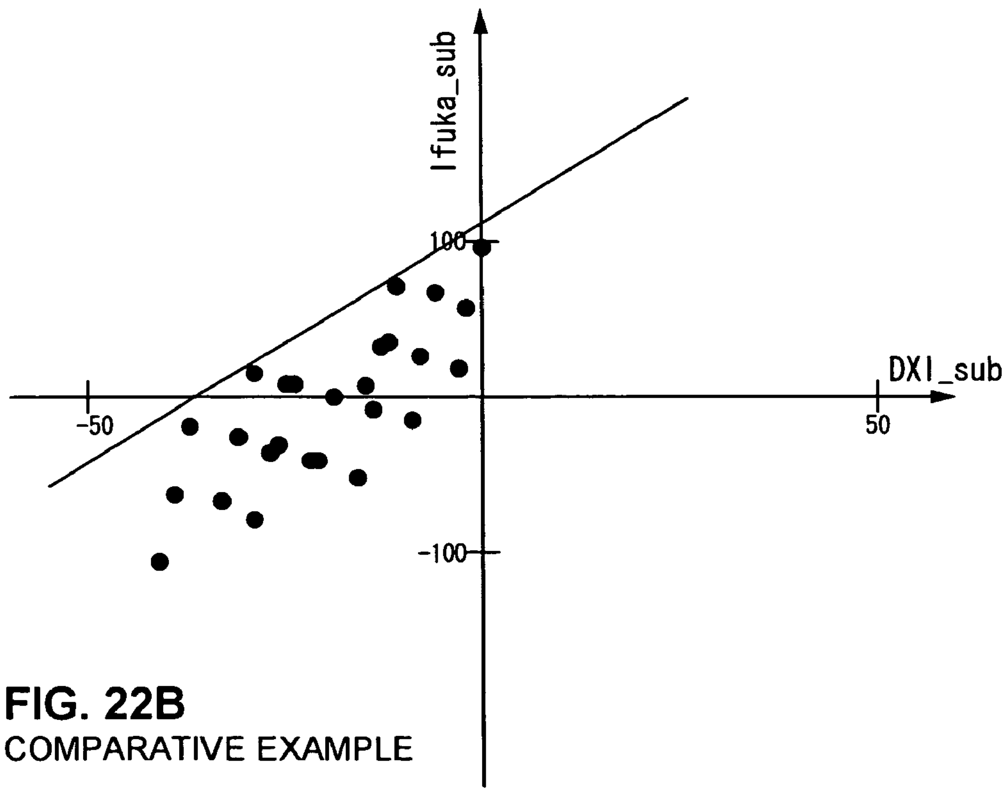
FIG. 22B is an explanatory diagram of the correction value calculation function of the comparative example.

FIG. 22B is an explanatory diagram of the correction value calculation function of a comparative example. In the comparative example of the figure, DXI_sub is calculated based on the difference between "the difference between the output signal value DXI_v1 and the output signal value DXI_v2" and "the difference between the output signal value DXI_v1' and the output signal value DXI_v2". It should be noted that in the present embodiment, DXI_sub is calculated based on the difference between "the sum of the output signal value DXI_v1 and the output signal value DXI_v2" and "the sum of the output signal value DXI_v1' and the output signal value DXI_v2'."

In the comparative example, the plotted points are more diffused than in the present embodiment.

Figure 23A:
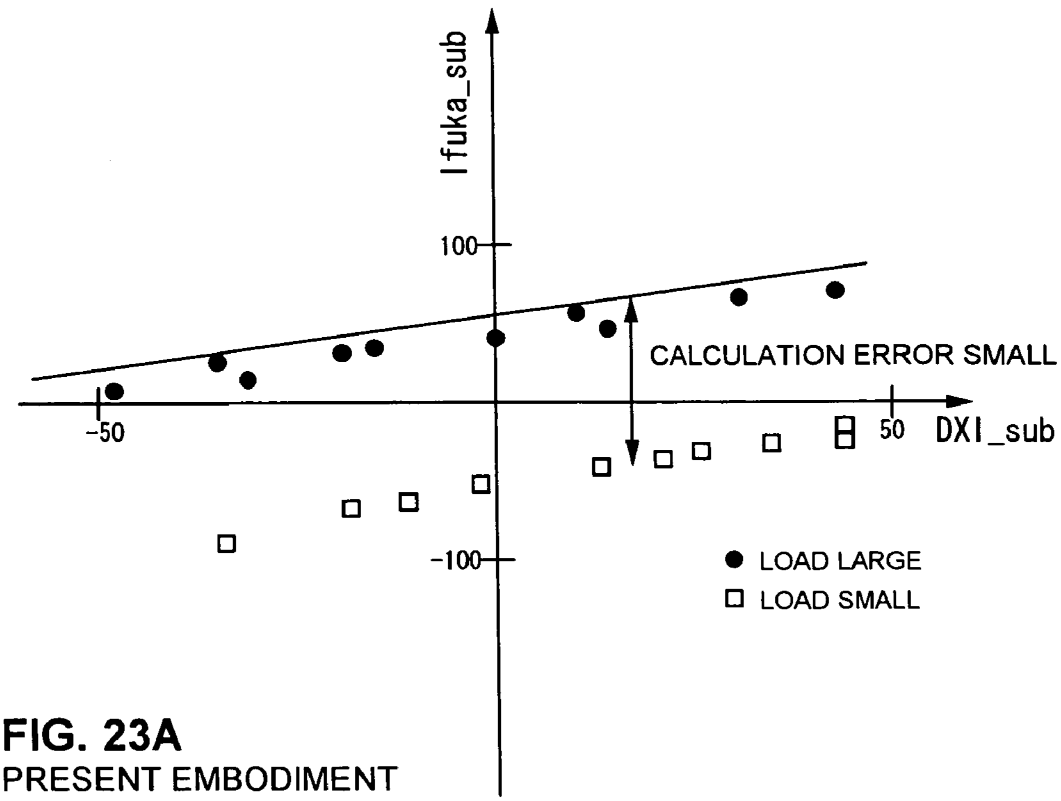
FIG. 23A plots DXI_sub and Ifuka_sub using the calculation method of the present embodiment, and FIG. 23B plots DXI_sub and Ifuka_sub using the calculation method of the comparative example.
Figure 23B:
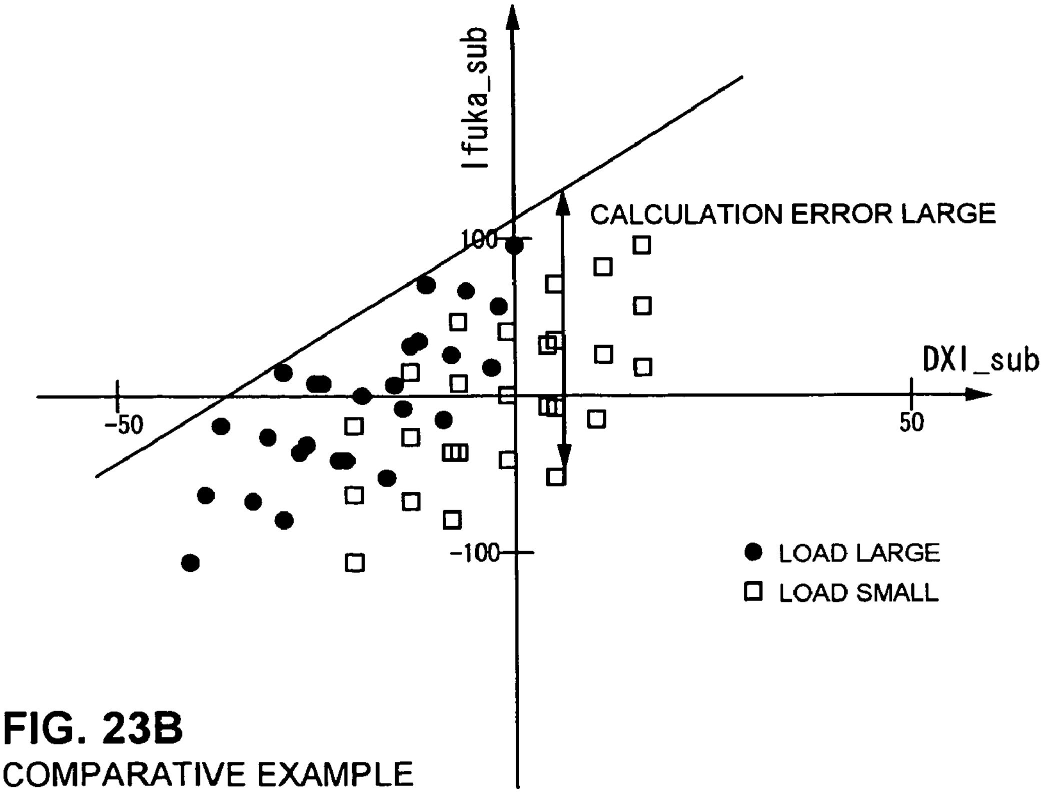

FIG. 23A plots the points when the load on the CR motor is large and when it is small using the methods for calculating DXI_sub and Ifuka_sub of the embodiment. FIG. 23B plots the points when the load on the CR motor is large and when it is small using the methods of calculating DXI_sub and Ifuka_sub of the comparative example. Black circles indicate the points when the load on the CR motor 32 is large, and white squares indicate the points when the load on the CR motor 32 is small.

The load on the CR motor changes depending on the amount of ink remaining in the ink cartridge mounted to the carriage 31. If a large amount of ink remains in the ink cartridge, then the ink cartridge is heavy and the load on the CR motor is large.

When creating the correction value calculation function discussed above, calculation is performed for a case where the load on the CR motor 32 is a maximum. Thus, if the load on the CR motor 32 is large, then a suitable correction value Ifuka_sub can be calculated through the correction value calculation function. On the other hand, if the correction value Ifuka_sub is calculated through the correction value calculation function when the load on the CR motor 32 is small, then the correction value Ifuka_sub becomes larger than necessary. As a result, the load current value Ifuka that is calculated becomes larger than the actual load current value and the estimated temperature of the CR motor 32 is estimated higher than the actual temperature, causing heat production restriction control to be started even though the actual temperature of the CR motor 32 is low.

However, with the present embodiment, the correction value that is calculated is kept from becoming too high compared to the comparative example, when the load on the CR motor 32 is small. Thus, with the present embodiment, the load current value Ifuka that is calculated is a smaller value than in the comparative example, leading to the estimated temperature of the CR motor 32 being set low so that unnecessary heat production restriction control is not performed and thereby allowing the printing speed to be increased.

===Other Embodiments===

The foregoing embodiment was described primarily with regard a printer. However, the foregoing embodiment is for the purpose of elucidating the present invention and is not to be interpreted as limiting the present invention. The invention can of course be altered and improved without departing from the gist thereof and includes equivalents. In particular, the embodiments mentioned below also fall within the scope of the invention.

<Regarding the Ink>

Since the foregoing embodiment was an embodiment of a printer, a dye ink or a pigment ink was ejected from the nozzles. However, the liquid that is ejected from the nozzles is not limited to such inks. For example, it is also possible to eject from the nozzles a liquid (including water) including metallic material, organic material (particularly macromolecular material), magnetic material, conductive material, wiring material, film-formation material, electronic ink, processing liquid, and genetic solutions. A reduction in material, process steps, and costs can be achieved if such liquids are directly ejected toward a target object.

<Regarding the Nozzles>

In the foregoing embodiment, ink was ejected using piezoelectric elements. However, the method for ejecting liquid is not limited to this. Other methods, such as a method for generating bubbles in the nozzles through heat, may also be employed.

<Regarding Driving the CR Motor>

In the foregoing embodiment, of among acceleration, constant velocity, and deceleration of the CR motor 32, PID control is performed only when the CR motor 32 is driven at a constant velocity. However, this is not a limitation. For example, it is also possible to continuously perform PID control while the CR motor 32 is accelerating, at a constant velocity, and decelerating.

<Regarding Calculation of the Heat-Production Amount>

In the foregoing embodiment, the heat-production amount Qpass of the CR motor per dot formation process is calculated based on the effective current value Ipass that is obtained by adding Ibase, which is the current value during acceleration and deceleration of the CR motor 32, and Ifuka, which is the current value of the CR motor 32 when at a constant velocity. However, calculation of the heat-production amount of the CR motor per dot formation process is not limited to this calculation.

For example, the heat-production amount Qpass of the CR motor 32 per dot formation process can also be calculated by adding the heat-production amount during acceleration Qbase, which the amount of heat produced by the CR motor 32 during acceleration, and the heat-production amount at constant velocity Qc, which is the amount of heat produced by the CR motor 32 when at a constant velocity.

In this case, a table relating the heat-production amount during acceleration Qbase and the carriage movement amount (target position) is stored in the memory 63 in advance. Once the target position has been determined, the controller 60 can obtain the heat-production amount during acceleration Qbase from the table. Further, the heat-production amount at constant velocity Qc can be calculated based on the current Ifuka flowing to the CR motor 32 during constant velocity and the time tc for which the motor rotates at constant velocity. The current Ifuka flowing to the CR motor 32 during constant velocity is measured through load measurement discussed above. The time tc for which the motor rotates at constant velocity is measured when printing is actually performed.

The following is a detailed description of another embodiment of the method of calculating the heat-production amount Qpass.

Figures 24, 25:
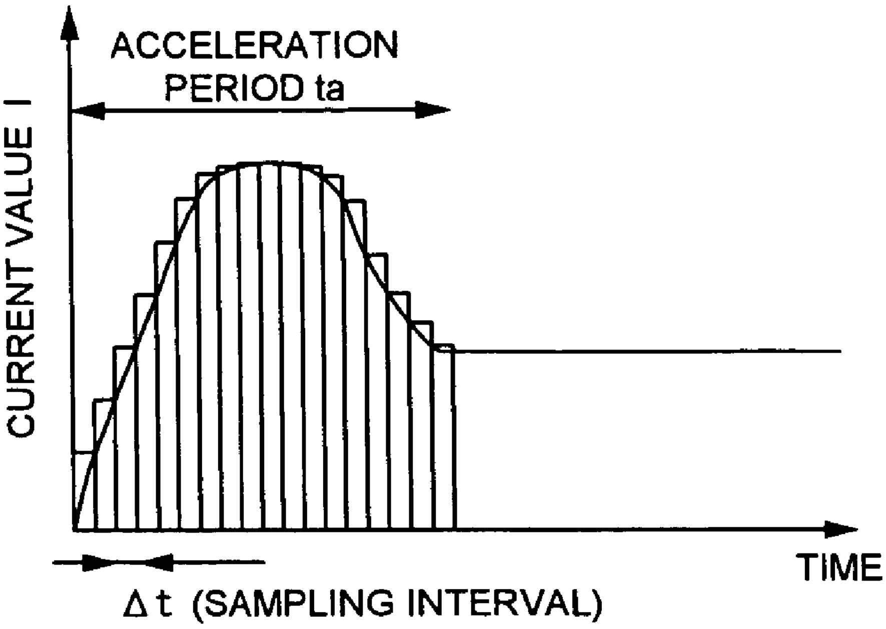
FIG. 24 is an explanatory diagram of the method of measuring the heat-production amount Qbase during acceleration.
FIG. 25 is the heat-production-during-acceleration table that is created.

FIG. 24 is an explanatory diagram of a method for measuring the heat-production amount during acceleration Qbase.

First, the CR motor 32 is driven at the same drive mode as when printing is actually performed. Next, the current I flowing to the CR motor 32 is consecutively measured per each brief time Δt. Next, the measured current value I is squared and multiplied by the brief time Δt to obtain the value $I^2 \cdot \Delta t$, and this value is consecutively summed. The result of this integration corresponds to the heat-production amount during acceleration Qbase. The heat-production-during-acceleration table that relates the carriage movement amount and the heat-production amount during acceleration Qbase is then created.

FIG. 25 is the heat-production-during-acceleration table that is created. Creation of the heat-production-during-acceleration table is performed in the factory where the printer is manufactured. The heat-production-during-acceleration table that has been created is then stored in the memory 63, and with this heat-production-during-acceleration table stored in the memory 63, the printer is shipped from the factory. It should be noted that the heat-production-during-acceleration table of this embodiment includes information on the acceleration period.

Next, the heat-production amount Qpass of the CR motor 32 per dot formation process is calculated. The heat-production amount Qpass is calculated by summing the heat-production amount during acceleration Qbase and the heat-production amount at constant velocity Qc.

The heat-production amount during acceleration Qbase can be found from the heat-production-during-acceleration table once the movement amount has been determined. The heat-production amount at constant velocity Qc can be calculated as $Ifuka^2 \times tc$, based on the current Ifuka flowing to the CR motor 32 during constant velocity and the time tc for which the motor rotates at constant velocity. It should be noted that the current value Ifuka is measured by load measurement, which is performed prior to printing. The time tc for which the motor rotates at constant velocity can be obtained by measuring the drive time tr of the CR motor during dot formation and subtracting the acceleration period ta from this drive time. It should be noted that the acceleration period ta can be found by referencing the heat-production-during-acceleration table once the carry amount has been determined.

For example, a case in which the movement amount is 1500 mm is described. The controller 60 analyzes the print data and determines that the carriage movement amount of the next dot formation process is 1500 mm. The controller 60 performs feedback control based on the output of the linear encoder 51 while moving the carriage 31 by 1500 mm. Then, due to a drive time timer that is not shown, the drive time tr of the period during which the CR motor 32 is driven up to the target position is measured. After driving of the CR motor 32, the controller 60 calculates the heat-production amount Qpass based on the following formula. It should be noted that Qb1 and ta1 in the formula are values that are determined by referring to the heat-production-during-acceleration table. Further, Ifuka in the formula is the current value measured through load measurement.

$$Qpass = Qb1 + Ifuka^2 \times (tr - ta1)\ (= Qbase + Qc)$$

<Temperature Estimation Process>

In the embodiment discussed above, the heat-production amount Qsigma per unit time is calculated and the heat-production amount Qsigma per minute is converted into the heat-production temperature ΔTnew, and by adding the newest heat-production temperature ΔTnew to the value obtained by multiplying the previous total heat-production temperature ΔTsum by the heat radiation coefficient K, a new total heat-production temperature ΔTsum of the motor was calculated. However, calculation does not have to be performed per unit time.

For example, since the CR motor 32 produces heat each time the dot formation process is performed, it is possible to calculate the newest total heat-production temperature ΔTsum of the motor for each dot formation process.

Figure 26:
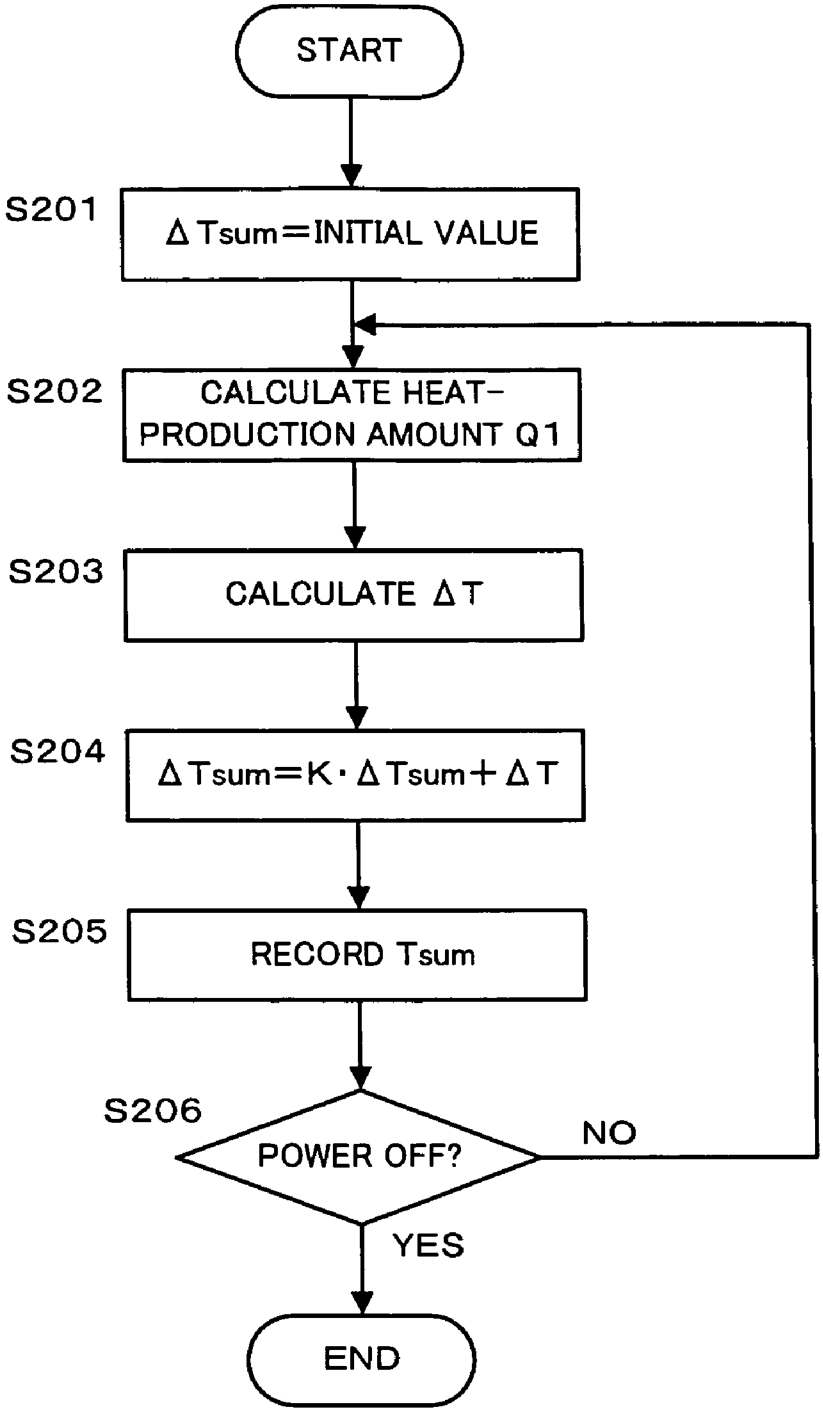
FIG. 26 is a flowchart of the temperature estimation process.

FIG. 26 is a flowchart of the temperature estimation process.

After the power is turned ON, first the controller 60 sets the value of ΔTsum to the initial value (S201).

When dot formation process is performed, the controller 60 calculates the heat-production amount Qpass for that dot formation process (S202). The calculation method is the same as that discussed earlier.

Next, the controller 60 converts the heat-production amount Qpass into the heat-production temperature ΔT (S203). ΔT is found by ΔT=Ka×Qpass. Here, Ka is the conversion coefficient for converting the heat-production amount Q to heat-production temperature ΔT, and is a value found through preliminary experiment and stored in the memory 63.

Next, the controller 60, taking natural heat radiation into account, calculates the total heat-production temperature ΔTsum (ΔTsum=K·ΔTsum+ΔT) by adding the heat-production temperature ΔT to the value obtained by multiplying the known total heat-production temperature ΔTsum by the heat radiation coefficient K (S204).

The heat radiation coefficient K is $K = exp(-t/\tau)$ when t is the amount of time elapsed from the previous calculation of ΔTsum and τ is the time constant. The time constant τ is a value found through preliminary experiment, and is stored in the memory 63. When a rest period is inserted between the intermediate drives of the CR motor 32, then the time t used to calculate the heat radiation coefficient K becomes large, and thus the heat radiation coefficient K becomes a small value. For that reason, a long rest period of the CR motor 32 allows the total heat-production temperature ΔTsum to be kept from increasing.

The controller 60 stores the total heat-production temperature ΔTsum that has been calculated in the memory 63 such as a RAM (S205). The total heat-production temperature ΔTsum becomes the estimated temperature of the CR motor. Further, the total heat-production temperature ΔTsum is used when calculating the total heat-production temperature ΔTsum in the next carry process. The controller 60 also determines whether or not to perform heat production restriction control based on the total heat-production temperature ΔTsum.

It should be noted that the temperature estimation process is constantly executed while the power is on, regardless of whether the CR motor 32 is being driven or stopped (NO in S206).

It is thus possible to estimate the temperature of the CR motor through the above process as well.

<Heat Production Restriction Control>

In the above embodiment, whether or not to perform heat production restriction control is determined based on whether or not the estimated temperature of the CR motor 32 exceeds a threshold value. However, it is also possible to set the length of the rest period in heat production restriction control in correspondence with the estimated temperature of the CR motor 32.

===In Summary===

(1) The printer of the above embodiment is provided with a CR motor 32, a PID control system (proportional element 76A, integral element 76B, and derivative element 76C) for controlling the CR motor 32, and a memory 63 for storing a correction value. Then, before a user who has purchased the printer carries out printing, the printer performs load measurement and calculates the current value based on the output signal value of the integral element 76B, and adds a correction value Ifuka_sub to this current value in order to calculate the current value Ifuka flowing to the CR motor 32.

In the factory where this printer is manufactured, it is necessary to set, in each printer, a correction value that suits the properties of the CR motor 32.

Accordingly, in this embodiment, a correction value calculation function indicating the relationship between the correction value Ifuka_sub and the sum of the output signal value DXI_v1 of the integral element 76B when the CR motor 32 is driven at the velocity V1 and the output signal value DXI_v2 of the integral element 76B when the CR motor 32 is driven at the velocity V2 is found in advance, for the case where properties of the CR motor 32 (for example, the voltage, counter-electromotive voltage coefficient, and resistance) fluctuate.

If the correction value calculation function is found from the relationship between the correction value and the difference between the output signal value DXI_v1 and the output signal value DXI_v2 instead of the relationship between the correction value and the sum of the output signal value DXI_v1 and the output signal value DXI_v2, then the result is that shown in FIG. 23B. When the correction value is calculated for each printer from a correction value calculation function such as that shown in FIG. 23B, then the correction value includes a large calculation error.

On the contrary, with the present embodiment, it is possible to use a correction value calculation function with which the calculation error that is included in the correction value can be reduced.

With the present embodiment, in the factory where the printer is manufactured, the output signal value DXI_v1' of the integral element 76B when the CR motor of the printer being manufactured is driven at a velocity V1 and the output signal value DXI_v2' of the integral element 76B when the CR motor of that printer is driven at a velocity V2 are obtained by measurement, and the correction value Ifuka_sub is determined from DXI_v1 and DXI_v2' (the sum of the two output signal values that have been measured) and the correction value calculation function (see Formula 15). Thus, it is possible to determine a correction value that is suited for that CR motor 32.

The printer that is manufactured in this embodiment stores the correction value in its memory 63, and thus through load measurement each printer can precisely calculate the value of the current flowing to the CR motor 32.

(2) The property values of the motor of the above-described printer fluctuate within a predetermined range. For example, the actual voltage Vp' of the CR motor 32 fluctuates within the range of 95% to 105% of the voltage Vp of the standard CR motor 32.

DXI_sub and Ifuka_sub are calculated by changing Vp', kE', and R' within this predetermined range, and are plotted on a graph having DXI_sub as its horizontal axis and Ifuka_sub as its vertical axis. It should be noted that the standard property values of the CR motor 32 (Vp, kE, R) and the property values of the motor that fluctuate within the predetermined range (Vp', kE', R') are used to calculate DXI_sub and Ifuka_sub. Since in the present embodiment there is little calculation error, the plotted points lineup on a substantially straight line. Then, in order for Ifuka_sub to be above the plotted points, a correction value calculation function expressed by Ifuka_sub=a ×DXI_sub+b is created.

By calculating the correction value using this correction value calculation function, the obtained correction value becomes a value that is suited for the properties of that motor.

(3) The horizontal axis DXI_sub of the above correction value calculation function (relationship) is calculated as (DXI_v1+DXI_v2)−(DXI_v1'+DXI_v2'). It should be noted that DXI_v1 and DXI_v2 are the output value of the integral element 76B when the CR motor 32 is driven at the velocity V1 and the output value of the integral element 76B when the CR motor 32 is driven at the velocity V2, respectively, when the properties of the CR motor 32 are the standard properties. DXI_v1' and DXI_v2' are the output value of the integral element 76B when the CR motor 32 is driven at the velocity V1 and the output value of the integral element 76B when the CR motor 32 is driven at the velocity V2, respectively, of an actual CR motor.

It should be noted that DXI_v1+DXI_v2 can be calculated from design values and thus can be calculated in advance, and the results of this calculation may be stored as a constant.

With the correction value calculation function indicating the relationship between the horizontal axis DXI_sub and the correction value Ifuka_sub, it is possible to calculate a correction value that is suited for the properties of that motor.

(4) In the above printer, the load on the CR motor changes when printing is performed. When the load on the motor changes in this way, then the correction values that are suited for when the load is large and when the load is small are different. For example, as shown in FIG. 23A, if the load is small, then the correction value Ifuka_sub indicated by the correction value calculation function should be a lower value than when the load is large, and thus when a common correction value calculation function is used regardless of the fluctuation in the load, a larger correction value than the most suitable correction value will be calculated.

However, with the present embodiment, the calculation error can be made smaller than in the comparative example (FIG. 23B), even if a large value is obtained for the correction value.

It should be noted that if the change in the load on the motor is known in advance, then it is also possible to change the correction value calculation function in accordance with the amount of the load. For example, it is possible to store in a database a correction value calculation function for when the load is large and a correction value calculation function for when the load is small. By doing this, it is possible to further reduce the calculation error.

(5) The printer described above is provided with a carriage for mounting an ink cartridge, and the CR motor moves the carriage. The ink cartridge weight differs depending on how much ink is remaining, and thus the load on the CR motor also fluctuates.

The foregoing embodiment is particularly effective for calculating correction values for such a CR motor. However, this is not a limitation, and correction values for the carry motor can also be found as in the foregoing embodiment.

(6) The CR motor 32 described above is driven through PWM control. The controller drives the CR motor 32 through PWM control, and thus the value of the current Ifuka that flows to the CR motor 32 cannot be found directly. Thus, the controller calculates Ifuka based on the output signal value DXI of the integral element 76B. The foregoing embodiment allows the value of the current flowing to the CR motor 32 to be calculated with high precision.

(7) The above printer calculates the amount of heat produced by the CR motor 32 during printing based on the value of the current Ifuka that flows to the CR motor 32. Thus, the temperature of the CR motor 32 can be estimated without providing a temperature sensor. Further, the foregoing embodiment allows the amount of heat produced by the CR motor 32 to be calculated with high precision.

(8) During printing, the printer described above determines the stop time for which the CR motor 32 is stopped based on the value of the current Ifuka that flows to the CR motor 32. More specifically, the heat-production amount Qpass is calculated based on Ifuka, and when the estimated temperature that has been calculated based on this heat-production amount exceeds a threshold value, then heat production restriction control is started and a stop time is inserted between the intermittent drives of the CR motor.

The printing speed becomes slow when heat production restriction control is performed. With the foregoing printer, however, the temperature of the CR motor 32 can be calculated with high precision, and therefore, it is possible to keep unnecessary heat production restriction control from being performed.

What is claimed is:

1. A method of calculating a correction value, comprising the steps of:

preparing a printer that is provided with a motor, a PID control system for controlling said motor, and a memory for storing a correction value, said printer being configured to calculate a value of a current flowing through said motor based on said correction value and an output value of an integral element of said PID control system;

obtaining in advance a relationship, for when a property of a motor fluctuates, between a correction value and a sum of an output value of the integral element when a motor is driven at a first velocity and an output value of the integral element when the motor is driven at a second velocity;

driving said motor of said printer at the first velocity and measuring an output value of said integral element at that velocity;

driving said motor of said printer at the second velocity and measuring an output value of said integral element at that velocity; and determining said correction value to be stored in said memory based on said relationship and a sum of the two output values that have been measured.

2. A method of calculating a correction value according to claim 1, wherein a property value of said motor fluctuates within a predetermined range; and wherein said relationship is obtained based on a standard property value of said motor and the property value of said motor fluctuating within said predetermined range.

3. A method of calculating a correction value according to claim 2, wherein said relationship is a relationship between said correction value and a difference between a value corresponding to a sum of an output value of the integral element when a motor is driven at the first velocity and an output value of the integral element when the motor is driven at the second velocity, for when the property of the motor is standard, and a sum of an output value of the integral element when a motor is driven at the first velocity and an output value of the integral element when the motor is driven at the second velocity, for when the property of the motor fluctuates.

4. A method of calculating a correction value according to claim 1, wherein when said printer executes printing, a load on said motor changes.

5. A method of calculating a correction value according to claim 4, wherein said printer is provided with a carriage for mounting an ink cartridge; and wherein said motor moves said carriage.

6. A method of calculating a correction value according to claim 1, wherein said motor is driven through PWM control.

7. A method of calculating a correction value according to claim 1, wherein when said printer executes printing, said printer calculates an amount of heat produced by said motor based on the value of the current flowing through said motor.

8. A method of calculating a correction value according to claim 1, wherein when said printer executes printing, said printer determines a stop time during which said motor is stopped based on the value of the current flowing through said motor.

9. A method of calculating a correction value, comprising the steps of:

preparing a printer that is provided with a motor, a PID control system for controlling said motor, and a memory for storing a correction value, said printer being configured to calculate a value of a current flowing through said motor based on said correction value and an output value of an integral element of said PID control system;

obtaining in advance a relationship, for when a property of a motor fluctuates, between a correction value and a sum of an output value of the integral element when a motor is driven at a first velocity and an output value of the integral element when the motor is driven at a second velocity;

driving said motor of said printer at the first velocity and measuring an output value of said integral element at that velocity;

driving said motor of said printer at the second velocity and measuring an output value of said integral element at that velocity; and determining said correction value to be stored in said memory based on said relationship and a sum of the two output values that have been measured;

wherein a property value of said motor fluctuates within a predetermined range;

wherein said relationship is obtained based on a standard property value of said motor and the property value of said motor fluctuating within said predetermined range;

wherein said relationship is a relationship between said correction value and a difference between a value corresponding to a sum of an output value of the integral element when a motor is driven at the first velocity and an output value of the integral element when the motor is driven at the second velocity, for when the property of the motor is standard, and a sum of an output value of the integral element when a motor is driven at the first velocity and an output value of the integral element when the motor is driven at the second velocity, for when the property of the motor fluctuates;

wherein when said printer executes printing, a load on said motor changes;

wherein said printer is provided with a carriage for mounting an ink cartridge;

wherein said motor moves said carriage and is driven through PWM control;

wherein when said printer executes printing, said printer calculates an amount of heat produced by said motor based on the value of the current flowing through said motor;

wherein when said printer executes printing, said printer determines a stop time during which said motor is stopped based on the value of the current flowing through said motor;

wherein when said printer executes printing, said printer accelerates an object to be moved with said motor and moves said object to be moved at a constant velocity until said object to be moved has been moved up to a target position;

wherein prior to performing printing, said printer measures an output value of said integral element when moving said object to be moved at said constant velocity; and wherein when said printer executes printing, said printer calculates the value of the current flowing through said motor when moving said object to be moved at said constant velocity based on said correction value and the output value of said integral element.

10. A method of manufacturing a printer, comprising the steps of:

preparing a printer that is provided with a motor, a PID control system for controlling said motor, and a memory for storing a correction value, said printer being configured to calculate a value of a current flowing through said motor based on said correction value and an output value of an integral element of said PID control system;

obtaining in advance a relationship, for when a property of a motor fluctuates, between a correction value and a sum of an output value of the integral element when a motor is driven at a first velocity and an output value of the integral element when the motor is driven at a second velocity;

driving said motor of said printer at the first velocity and measuring an output value of said integral element at that velocity;

driving said motor of said printer at the second velocity and measuring an output value of said integral element at that velocity; and storing, in said memory of said printer, said correction value to be stored in said memory that is determined based on said relationship and a sum of the two output values that have been measured.

* * * * *